US012271666B2

(12) United States Patent
Cunha et al.

(10) Patent No.: US 12,271,666 B2
(45) Date of Patent: Apr. 8, 2025

(54) MULTI-INSTANCED SIMULATIONS FOR LARGE ENVIRONMENTS

(71) Applicant: Dassault Systemes, Vélizy-Villacoublay (FR)

(72) Inventors: Guilherme Cunha, Vélizy-Villacoublay (FR); Everton Hermann, Vélizy-Villacoublay (FR); Cyril Ngo Ngoc, Vélizy-Villacoublay (FR)

(73) Assignee: Dassault Systemes, Vélizy-villacoublay (FR)

( * ) Notice: Subject to any disclaimer, the term of this patent is extended or adjusted under 35 U.S.C. 154(b) by 88 days.

(21) Appl. No.: 16/724,890

(22) Filed: Dec. 23, 2019

(65) Prior Publication Data

US 2020/0202059 A1    Jun. 25, 2020

(30) Foreign Application Priority Data

Dec. 21, 2018    (EP) .................................. 18306834

(51) Int. Cl.
*G06F 30/27*    (2020.01)
*F03D 17/00*    (2016.01)
(Continued)

(52) U.S. Cl.
CPC ........ *G06F 30/27* (2020.01); *A63F 2300/663* (2013.01); *F03D 17/007* (2023.08);
(Continued)

(58) Field of Classification Search
None
See application file for complete search history.

(56) References Cited

U.S. PATENT DOCUMENTS

| 7,783,997 B1 | 8/2010 | Vanspauwen |
| 8,099,265 B2 * | 1/2012 | Houston ................. G06T 17/00 703/9 |

(Continued)

FOREIGN PATENT DOCUMENTS

| CN | 101082934 A | 12/2007 |
| CN | 101496027 A | 7/2009 |

(Continued)

OTHER PUBLICATIONS

Michel Bergmann et al, "A zonal Galerkin-free POD model for incompressible flows" Journal of Computational Physics 352 (2018) 301-325 (Year: 2017).*

(Continued)

*Primary Examiner* — Akash Saxena
(74) *Attorney, Agent, or Firm* — Oblon, McClelland, Maier & Neustadt, L.L.P.

(57) ABSTRACT

The disclosure notably relates to a computer-implemented method for simulating together a plurality of physics simulation instances included in a global physics simulation. The method includes creating a database of local simulation instances. The creating includes providing a set of local simulations. The set of local simulations includes at least two local simulations. A local simulation is a physics simulation that is part of the global physics simulation and that can be computed alone and independently of the multiphysics simulation. Each local simulation of the set of local simulations is already computed. The creating further includes, for each local simulation of the set of local simulations, computing a respective reduced model of the local simulation. The creating further includes, for each local simulation of the set of local simulations, storing in the database a respective local simulation instance. The respec- (Continued)

tive local simulation instance includes the respective computed reduced model.

17 Claims, 13 Drawing Sheets

(51) Int. Cl.
  G06F 111/10 (2020.01)
  G06F 113/08 (2020.01)
(52) U.S. Cl.
  CPC ...... *F03D 17/008* (2023.08); *F05B 2270/204* (2020.08); *G06F 2111/10* (2020.01); *G06F 2113/08* (2020.01)

(56) References Cited

U.S. PATENT DOCUMENTS

| | | | |
|---|---|---|---|
| 10,176,278 B2 * | 1/2019 | Belmans | G06F 30/20 |
| 11,339,763 B2 * | 5/2022 | Chioua | G06F 11/30 |
| 11,461,518 B2 * | 10/2022 | Cunha | G06F 30/17 |
| 2008/0091392 A1 | 4/2008 | Canning | |
| 2009/0306943 A1 | 12/2009 | Abdel-Khalik et al. | |
| 2011/0182349 A1 | 7/2011 | Ananthanarayanan et al. | |
| 2012/0041734 A1 * | 2/2012 | Chevalier | G05B 17/02 703/8 |
| 2012/0296619 A1 | 11/2012 | Maliassov et al. | |
| 2013/0132054 A1 * | 5/2013 | Sharma | G16H 30/40 703/9 |
| 2013/0179142 A1 * | 7/2013 | Kim | G06F 30/33 703/14 |
| 2014/0168219 A1 | 6/2014 | Das et al. | |
| 2017/0046458 A1 | 2/2017 | Meagher et al. | |
| 2017/0315266 A1 | 11/2017 | Myers et al. | |
| 2017/0324544 A1 * | 11/2017 | Marin | H04L 9/008 |
| 2020/0160207 A1 * | 5/2020 | Song | G06F 11/3466 |
| 2020/0202052 A1 * | 6/2020 | Cunha | G06F 30/17 |
| 2020/0202053 A1 * | 6/2020 | Hermann | G06F 17/13 |
| 2020/0327204 A1 * | 10/2020 | Singh | G06F 30/20 |

FOREIGN PATENT DOCUMENTS

| | | |
|---|---|---|
| CN | 101710467 A | 5/2010 |
| CN | 102231133 A | 11/2011 |
| CN | 103294850 A | 9/2013 |
| CN | 103886638 A | 6/2014 |
| CN | 103914582 A | 7/2014 |
| CN | 104217460 A | 12/2014 |
| CN | 104268002 A | 1/2015 |
| CN | 106156205 A | 11/2016 |
| CN | 106713923 A | 5/2017 |
| CN | 107067473 A | 8/2017 |
| CN | 108052772 A | 5/2018 |
| CN | 109033720 A | 12/2018 |
| EP | 3 188 033 A1 | 7/2017 |
| EP | 3 301 572 A1 | 4/2018 |
| FR | 3060157 A1 | 6/2018 |
| KR | 10-2013-0081354 A | 7/2013 |
| WO | WO 2016/127421 A1 | 8/2016 |
| WO | WO 2017/167278 A1 | 10/2017 |

OTHER PUBLICATIONS

H. Kim and C. Singh, "Three dimensional clustering in wind farms with storage for reliability analysis," 2013 IEEE Grenoble Conference, Grenoble, France, 2013, pp. 1-6, doi: 10.1109/PTC.2013. 6652253 (Year: 2013).*

Hector A. Pulgar-Painemal et al, "Towards a wind farm reduced-order model", Electric Power Systems Research, vol. 81, Issue 8, 2011, pp. 1688-1695, ISSN 0378-7796. (Year: 2011).*

European Search Report issued Jun. 7, 2019, in Patent Application No. 18306833.7.

European Search Report issued Jun. 7, 2019, in Patent Application No. 18306834.5.

Extended European Search Report issued Aug. 1, 2019, in Patent Application No. 18306832.9.

Michel Bergmann, et al., "A zonal Galerkin-free POD model for incompressible flows", Journal of Computational Physics, vol. 352, XP055593066, 2018, pp. 301-325.

Emiliano Iuliano, et al., "Proper Orthogonal Decomposition, surrogate modelling and evolutionary optimization in aerodynamic design", Computers and Fluids, vol. 84, XP028684771, 2013, pp. 327-350.

Marijn P. Zwier, et al., "Physics in Design: Real-time numerical simulation integrated into the CAD Environment", Procedia CIRP, $27^{th}$ CIRP Design, vol. 60, 2017, pp. 98-103.

Katrina Calautit, et al., "A Review of Numerical Modelling of Multi-Scale Wind Turbines and Their Environment", Computation, vol. 6, No. 24, Mar. 5, 2018, pp. 1-37.

Sara Louise Walker, et al., "Building mounted wind turbines and their suitability for the urban scale—A review of methods of estimating urban wind resource", Energy and Buildings, vol. 43, 2011, pp. 1852-1862.

Hong Huang, et al., "Urban thermal environment measurements and numerical simulation for an actual complex urban area covering a large district heating and cooling system in summer," Atmospheric Environment, vol. 39, Issue 34, 2005, pp. 6362-6375.

Stéphane Redonnet, "Development of a Hybrid Methodology for the Numerical Simulation in Aeroacoustics, with Application to the Mitigation of Aircraft Noise", [physics.class-ph] Aix-Marseille Universite, Thesis for an Accreditation to Supervise Research, Accreditation to Supervise Research (HDR), 2016, 251 pages.

J. Blazek, "Computational Fluid Dynamics: Principles and Applications", Elsevier Science, 2001, 456 pages.

Matthew F. Barone, et al., "Reduced Order Modeling of Fluid/Structure Interaction," Sandia National Laboratories Sandia Report, SAND No. 7189, Sep. 2009, 122 pages.

C. W. Rowley, "Model Reduction for Fluids, Using Balanced Proper Orthogonal Decomposition", Modeling and Computations in Dynamical Systems: In Commemoration of the 100th Anniversary of the Birth of John Von Neumann, vol. 13, Series B, 2006, pp. 301-317.

Clarence W. Rowley, et al., "Model reduction for compressible flows using POD and Galerkin projection", Physica D: vol. 189, 2004, pp. 115-129.

Francisco Chinesta, et al., "Model Order Reduction", Encyclopedia of Computational Mechanics, 2004, 59 pages.

Veroy, et al., "Certified real-time solution of the parametrized steady incompressible Navier—Stokes equations: rigorous reduced-basis a *posteriori* error bounds", International Journal for Numerical Methods in Fluids, vol. 47, XP055609183, 2005, pp. 773-788.

Alan Norton, et al., "The VAPOR Visualization Application" High Performance Visualization: Enabling Extreme-Scale Scientific Insight, Chapter 20, XP055602266, Oct. 25, 2012, pp. 73-85.

S. Li, et al., "Data Reduction Techniques for Simulation, Visualization and Data Analysis", Computer Graphics Forum, vol. 37, No. 6, XP055602247, 2018, pp. 422-447.

Lawrence Ibarria, et al., "Out-of-core compression and decompression of large n-dimensional scalar fields", EUROGRAPHICS, vol. 22, No. 3, 2003, pp. 343-348.

Stefan Guthe, et al., "Real-time Decompression and Visualization of Animated Volume Data", IEEE Visualization, Oct. 21-26, 2001, pp. 9 pages.

John D. Villasenor, et al., "Seismic Data Compression Using High-Dimensional Wavelet Transforms", IEEE Proceedings of Data Compression Conference—DCC '96, 1996, pp. 396-405.

Shaomeng Li, et al., "Spatiotemporal Wavelet Compression for Visualization of Scientific Simulation Data", IEEE International Conference on Cluster Computing, 2017, pp. 216-227.

Aaron Trott, et al., "Wavelets Applied to Lossless Compression and Progressive Transmission of Floating Point Data in 3-D Curvilinear Grids", Proceedings of the 7th IEEE Visualization Conference (VIS'96), 1996, 4 pages.

"SIMULIA Introduction Training: Efficient training to learn new software: Introcourses for Abaqus, Isight, fe-safe, Tosca & 3DEXPERI-

(56) References Cited

OTHER PUBLICATIONS

ENCE Platform", Simuleon by Techna, https://www.simuleon.com/simulia-introduction-training/, Aug. 7, 2020, 15 pages.

"Complete Solutions for Realistic Simulation", Abaqus Unified FEA, Dassault Systèmes, https://www.3ds.com/products-services/simulia/products/abaqus/, Aug. 7, 2020, 4 pages.

"Computational Fluid Dynamics Simulation Software Improving Product Design & Development", Powerflow, CFD Software Solution for Aerodynamic Design—Dassault Systèmes, https://www.3ds.com/products-services/simulia/products/powerflow/, Aug. 7, 2020, 5 pages.

"Fluids Simulations to Improve Real-World Performance", XFLOW, High Fidelity CFD—Dassault Systèmes, https://www.3ds.com/products-services/simulia/products/xflow/, Aug. 7, 2020, 4 pages.

Li, Tao, "Study on Technologies of Sparse Representation and Compressing Transmission of Local Time-varying Signal", Oct. 2017, w/English Abstract. (68 pages).

Li, Xinliang et al., "Assessment of the Compressible Turbulence Model by Using the DNS Data", Chinese Journal of Theoretical Applied Mechanics, vol. 44, No. 2, Mar. 2012, pp. 223-229, w/English Abstract. (8 pages).

Lin, Xiezhao et al., "Present Situation of Adaptive POD Method for Fluid—solid Coupling Model", Apr. 2017, pp. 78-83, w/English Abstract, (6 pages).

Wu, Xuehong et al., "Reduced Order Model for Fast Computation of Incompressible Fluid Flow Problem", Proceedings of the CSEE, vol. 30 No. 26, Sep. 15, 2010, pp. 69-74, w/English Abstract. (6 pages).

Office Action dated Jun. 5, 2024, issued in counterpart CN Application No. 201911338129.2, with English translation. (11 pages).

Combined Chinese Office Action and Search Report issued Jun. 28, 2024, in corresponding Chinese Patent Application No. 201911334907.0 (with English Translation), 31 pages.

Combined Chinese Office Action and Search Report issued Feb. 1, 2024, in Chinese Patent Application No. 201911337061.6 (with English translation), 17 pages.

Chen, G. et al., "Advances and Prospects of the Reduced Order Model for Unsteady Flow and Its Application," Advances in Mechanics, vol. 41, No. 6, Nov. 25, 2011, 16 pages (with English abstract).

\* cited by examiner

MULTI-INSTANCED SIMULATIONS FOR LARGE ENVIRONMENTS

CROSS-REFERENCE TO RELATED APPLICATIONS

This application claims priority under 35 U.S.C. § 119 or 365 to European Application No. 18306834.5, filed Dec. 21, 2018. The entire contents of the above application(s) are incorporated herein by reference.

FIELD OF THE INVENTION

The invention relates to the field of engineering and physics simulations.

BACKGROUND

Nowadays, great attention is paid to the development of renewable and sustainable technologies, such as renewable energy sources, development of clean-smart cities, conception of transportation means coping with environmental rules to name a few.

In order to make viable the development of sustainable solutions to development of renewable and sustainable technologies, it is well accepted that the use of Numerical Simulation tools is mandatory. As a matter of fact, the need to take into account the presence of uncertain conditions on a large scale (wind speed, building distribution, weather conditions during aircraft travels, etc.) and interaction effects between different elements of a given scene (different buildings, different wind turbines, different parts of an aircraft, etc.) make it unviable the use of experiments in the design phase.

Concurrently, an established way of evaluating a design is using numerical methods via dedicated software. However, setting up numerical simulations in early design phases is very consuming, in particular when the environment (the environment is also referred to as the scene, where the scene is the 3D space in which the simulation is executed) to which the new design will be submitted changes repeatedly. This is largely due to the fact that, for each environment change, the scene must be adapted accordingly, i.e. one needs to re-mesh, re-apply boundary conditions and re-calculate the entire solution (see Marijn P. Zwier, Wessel W. Wits. "Physics in Design: Real-time Numerical Simulation Integrated into the CAD Environment". Procedia CIRP, Volume 60, 2017, Pages 98-103, ISSN 2212-8271, doi.org/10.1016/j.procir.2017.01.054). Also, in the case of large domains, i.e. large scene environments, the cost associated with simulation means (simulation time, data storage, etc.) grows exponentially (see J. Blazek. "Computational Fluid Dynamics: Principles and Applications". ISBN: 978-0-08-044506-9. Elservier Science, 2005, 2nd Edition).

For large scale simulations, such as fluid flows simulations, structural mechanics simulations, plasma dynamics simulations, physics simulations that can make use of multi-instancing, or simulations for any field needing the use of physical models simulated in a virtual world (such as video games or animated movies), one needs to run the simulation tool for the entire domain. When facing the need of computing together several simulations comprised in a scene of a large scale simulation, only solutions that run the entire set of all simulations are known. Such solutions are not adapted to the instancing of large scale simulations where one needs to change the scene disposition a lot.

Within this context, there is still a need for an improved method for simulating together a plurality of physics simulation instances included in a physics simulation.

SUMMARY OF THE INVENTION

It is therefore provided a computer-implemented method for simulating together a plurality of physics simulation instances included in a global physics simulation. The method comprises creating a database of local simulation instances. The creating (S0) comprises providing a set of local simulations. The set of local simulations comprises at least two local simulations. A local simulation is a physics simulation that is part of the global physics simulation and that can be computed alone and independently of the multi-physics simulation. Each local simulation of the set of local simulations is already computed. The creating further comprises, for each local simulation of the set of local simulations, computing a respective reduced model of the local simulation. The creating further comprises, for each local simulation of the set of local simulations, storing in the database a respective local simulation instance. The respective local simulation instance comprises the respective computed reduced model. The method further comprises selecting at least two local simulation instances in the database of local simulation instances. The method further comprises computing the global physics simulation. The computing of the global physics simulation comprises reusing each respective computed reduced model comprised in each local simulation instance of the selected at least two local simulation instances.

This constitutes an improved method for simulating together a plurality of physics simulation instances included in a physics simulation.

The method may comprise one or more of the following:
the global physics simulation is associated with a global domain and each local simulation is associated with a respective local domain, and the method further comprises:
before the computing of each respective reduced model of each local simulation:
selecting a respective zone of interest of the local simulation, the respective zone of interest being a non-empty sub-domain of the respective local domain;
at the computing of each respective reduced model of each local simulation:
each respective reduced model is computed at the border of the respective zone of interest;
at the computing of the global physics simulation:
placing the respective zone of interest of each local simulation of the selected at least two simulation instances in the global domain; and
only the remaining part of the global domain is computed, the remaining part being the part of the global domain that is occupied by no zone of interest, the global domain comprising regions that are respectively occupied by each respective zone of interest of each local simulation of the selected at least two local simulation instances;
the method further comprises, at the placing of the respective zone of interest of each local simulation of the selected at least two local simulation instances, interfacing the border of the respective zone of interest with the border of the region of the global domain occupied by the respective zone of interest;

the method further comprises, for each local simulation of
the set of local simulations, after the computing of the
respective reduced model:
  defining probes, the probes being points of the respective local domain of the local simulation which are contiguous to the respective zone of interest, each probe comprising simulation data of the local simulation, wherein the stored local simulation instance comprising the respective computed reduced model further comprises the probes and the respective zone of interest;
during the computing of the global physics simulation, at least two simulations local instances of the at least two selected local simulation instances interact, the interaction resulting in that probes of at least one local simulation instance of the at least two simulation instances are enriched, and as a result of enriching probes, the respective computed reduced model comprised in a local simulation instance of which probes are enriched is corrected;
the method further comprises, for each local simulation instance of which probes are enriched:
  before the correcting of the respective computed reduced model, computing a difference between the set of all enriched probes and the set of corresponding probes before their enrichment;
  determining if the difference exceeds a predetermined threshold; and
  correcting the respective computed reduced model if it is determined that the difference exceeds the predetermined threshold;
the method further comprises:
  at the creating of the database of local simulation instances, learning a machine-learning algorithm on the local simulation instances stored in the database, the machine-learning algorithm providing, for each local simulation instance of the database, a respective relation between the probes stored in the local simulation instance and the respective computed reduced model stored in the local simulation instance; and
  for each local simulation instance of which probes are enriched, correcting the respective computed reduced model comprised in the local simulation instance comprises applying the machine-learning algorithm, the correcting being performed based on the respective relation;
at each correcting of a respective reduced model as a result of the enriching of probes, a simulation instance is stored in the database, the simulation instance comprising the corrected reduced model and the enriched probes;
the method further comprises, after the computing of the global physics simulation:
  adding a new local simulation instance to the database of local simulation instances, the adding of the new local simulation instance comprising:
    providing a new local simulation, the new local simulation being already computed, the new local simulation being associated with a respective local domain;
    selecting a respective zone of interest of the new local simulation, the respective zone of interest being a non-empty sub-domain of the respective local domain;
    computing a respective reduced model of the new local simulation at the border of the respective zone of interest;
    defining probes, the probes being points of the respective local domain which are contiguous to the respective zone of interest, each probe comprising simulation data of the new local simulation; and
    storing in the database a new local simulation instance comprising the respective reduced model of the new local simulation, the probes of the new local simulation and the respective zone of interest of the new local simulation,
  the adding resulting in that the new simulation instance is one of the local simulation instances of the database of local simulation instances, and the method further comprises:
    after the adding of the new local simulation instance, re-learning the machine-learning algorithm on the database of simulation instance;
    re-selecting at least two local simulation instances in the database of local simulation instances, the re-selected at least two local simulation instances comprising the new local simulation instance; and
    re-computing of the global physics simulation with the re-selected at least two local simulation instances;
  the method further comprises, after the relearning and before the re-computing, modifying the global physics simulation;
  the adding and the re-computing are iterated;
  each respective local domain of each local simulation comprises a respective physical object, the local simulation simulating a respective physical behavior associated with the respective physical object; and the global physics simulation simulates a physical behavior of the set of all respective physical objects; and/or
  all local simulations are perturbations of a given local simulation, the given local simulation being part of the set of local simulations.

It is further provided a computer program comprising instructions for performing the method.

It is further provided a computer readable storage medium having recorded thereon the computer program.

It is further provided a computer comprising a processor coupled to a memory and a display, the memory having recorded thereon the computer program.

BRIEF DESCRIPTION OF THE DRAWINGS

Examples of the invention will now be described, by way of non-limiting example, and in reference to the accompanying drawings, where.

DETAILED DESCRIPTION OF THE INVENTION

Figure 1:
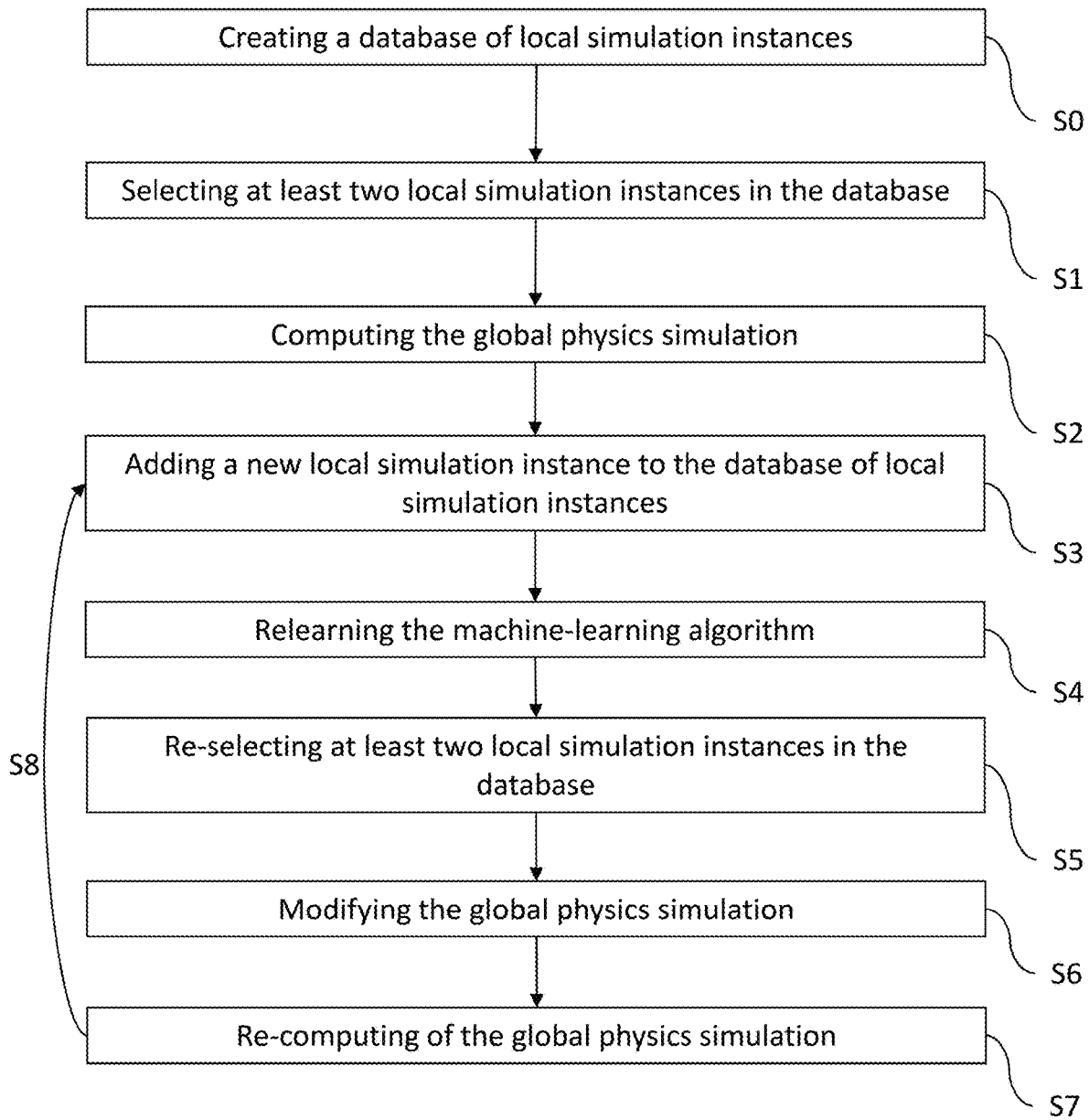
FIG. 1 shows a flowchart of an example of the method.

With reference to the flowchart of FIG. 1, it is provided a computer-implemented method for simulating together a plurality of physics simulation instances included in a global physics simulation. The method comprises creating S0 a database of local simulation instances. The creating S0 comprises providing S10 a set of local simulations. The set of local simulations comprises at least two local simulations. A local simulation is a physics simulation that is part of the global physics simulation and that can be computed alone and independently of the global physics simulation. Each local simulation of the set of local simulations is already computed. The creating S0 further comprises, for each local simulation of the set of local simulations, computing S30 a respective reduced model of the local simulation. The creating S0 further comprises, for each local simulation of the set of local simulations, storing S50 in the database a respective local simulation instance, the respective local simulation instance comprising the respective computed reduced model. The method further comprises selecting S1 at least two local simulation instances in the database of local simulation instances. The method further comprises computing S2 the global physics simulation. The computing S2 of the global physics simulation comprises reusing S220 each respective computed reduced model comprised in each local simulation instance of the selected at least two local simulation instances.

Such a method improves the simulating together of a plurality of physics simulation instances included in a global physics simulation. First, local parts of the global physics simulation, namely the local simulations of which computed reduced models are reused, are already computed. When computing the global physics simulation, the method thus does not recompute the already computed local parts. In other words, the method allows to compute a physics simulation, while simulating together local parts of the physics simulation, relatively fast, and with an economical use of computer resources. Second, only the reduced models of already computed local parts of the global physics simulation are reused when computing the global physics simulation. The reduced model of a simulation requires less storage and computing resources than the simulation itself but still captures the physics of the simulation. As such, each reduced model which is reused is substantially equivalent to a simulation result of the corresponding local simulation. This implies that the method not only computes a physics simulation comprising local parts in a faster and economical way but does so while guaranteeing a certain physical accuracy. Furthermore, in examples each local simulation has a time scale that is different from the time scale of the global physics simulation. These multiscale issues may make the computing of the global physics simulation complicated and/or costlier in terms of time and/or computing resources, because different physics model may evolve at different time scales which all need to be considered. By not recomputing the local simulations, the computing S2 of the global physics simulation according to the invention may only consider the time scale of the global physics simulation and not the timescales of the local simulations, thus reducing or even avoiding these multiscale issues.

In all the present description, including the above and the following, at least one means one or more and at least two means two or more.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system (e.g. a computer system) adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 5:
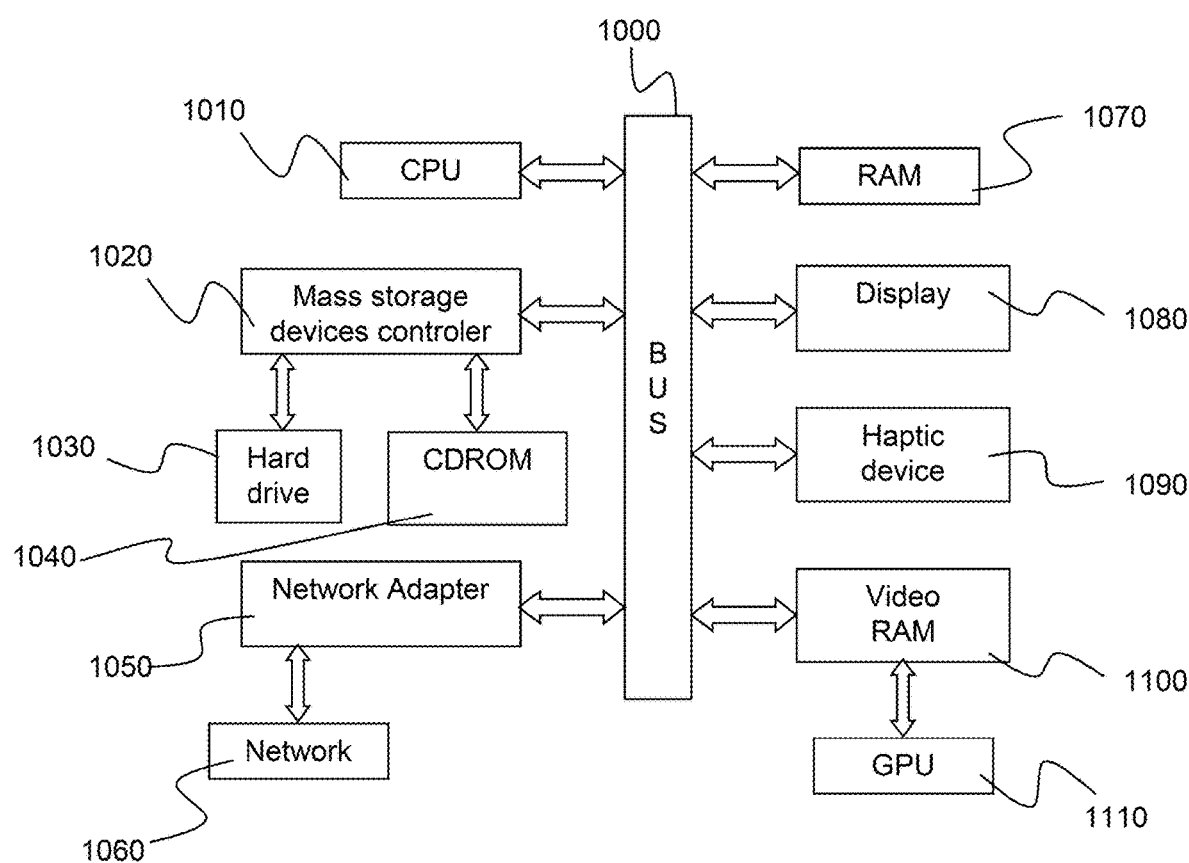
FIG. 5 illustrates an example of a computer of the invention.

FIG. 5 shows an example of the system, wherein the system is a client computer system, e.g. a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively, or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The system may be any combination of a CAD system, a CAE system, a CAM system, a PDM system and/or a PLM system. In those different systems, modeled objects are defined by corresponding data. A modeled object is any object defined by data stored e.g. in the database. By extension, the expression "modeled object" designates the data itself. According to the type of the system, the modeled objects may be defined by different kinds of data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

The method is for simulating together a plurality of physics simulation instances included in a global physics simulation.

A physics simulation is any simulation from one or more field of physics, such as electronics, electricity, mechanics, electro-mechanics, fluid mechanics, gravitational mechanics, statistical mechanics, wave physics, statistical physics, particle systems, hydraulic systems, quantic physics, geophysics, astrophysics, chemistry, aerospatial, geomagnetism, electromagnetism, plasma physics or computational fluid dynamics (CFD). The physics simulation may also be a multi-physics simulation that is a simulation involving several fields of physics. It may be the simulation of at least one behavior in time of any physics or multi-physics system from one or more fields of physics, including the above list of examples.

"Global" means that the physics simulation comprises at least one local part, hereinafter called a local simulation that is a physics simulation that makes part of the global physics simulation, but that can be computed alone and independently of the global physics simulation. It can be understood that the global simulation may be a multi-physics simulation where each local part is a physics simulation from a respective field of physics. It can be understood that any local simulation may also be a multi-physics simulation. It is to be understood that the computation of the global simulation involves the computation of the local simulation and further computations. The further computations depend on the computation of the local simulations and the computation of the local simulations is not sufficient for performing the computation of the global computation.

A physics or multi-physics system is any real-world system or physical entity whose behavior (e.g. in time) can be simulated via at least one physics model from at least one field of physics (such as one of the above examples of physics fields). A real-world system or physical entity may be a real-world object, an electronic product, an electrical product, a mechanical product, a chemical product, an electromechanical product, a system of particles or an electromagnetic product. A physics model may be an electronical model, an electrical model, a mechanical model, a statistical model, a particle model, a hydraulic model, a quantic model, a geological model, an astronomic model, a chemical model, an electromagnetic model or a fluid model. A physics model may be a system of one or more equations, such as one or more differential equations and/or partial differential equations and/or algebraic equations. A multi-physics system generally has sub-systems that are themselves physics or multi-physics systems and that are altogether connected by physics or logics relations, e.g. given by physics laws. A multi-physics system is thus a model to represent real world system or any physical entity comprising sub-systems related together by physical or logical relations, such as mechanical relations (e.g. corresponding to connections for transmitting a force or movement), electrical relations (e.g. corresponding to electrical connections, for example in a circuit), hydraulic relations (e.g. corresponding to conducts that transmit fluxes), logical relations (e.g. corresponding to flows of information), fluid relations (e.g. corresponding to a fluid flow), chemical relations and/or electro-magnetic relations. The system is called "multi-physics" because the physical or logical relations of a multi-physics system can belong to several fields of physics (although this is not necessary the case).

A physics or multi-physics system may correspond to an industrial product to be manufactured in the real world subsequent to the completion of its virtual design, such as a (e.g. mechanical) part or assembly of parts, or more generally any rigid body assembly (e.g. a mobile mechanism), rigid body mechanism. A CAD and/or CAE software solution allows the design of products in various and unlimited industrial fields, including: aerospace, architecture, construction, consumer goods, high-tech devices, industrial equipment, transportation, marine, and/or offshore or transportation. A physics or multi-physics system may thus represent an industrial product which may be a part (or the whole) of a terrestrial vehicle (including e.g. car and light truck equipment, racing cars, motorcycles, truck and motor equipment, trucks and buses, trains), a part (or the whole) of an air vehicle (including e.g. airframe equipment, aerospace equipment, propulsion equipment, defense products, airline equipment, space equipment), a part (or the whole) of a naval vehicle (including e.g. navy equipment, commercial ships, offshore equipment, yachts and workboats, marine equipment), a mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). The global physics simulation may be the simulation of a behavior of at least one industrial product to be manufactured in the real-world, of which design has already been performed. The simulation may simulate at least one behavior (e.g. an evolution in time) of the at least one industrial product subsequent to its design. The method may be followed by the manufacturing in the real-world of the at least one industrial product subsequent to its simulation by the method.

Simulating a physics or multi-physics system modelized by at least one physics model generally comprises computing an approximation of a physical behavior in time (e.g. an evolution in time) of the system by computing the at least one physics model and/or storing the results and/or displaying the results. Computing the at least one physics model may be preceded by the providing of at least one grid (or mesh) and/or at least one time step and/or at least one simulation parameter. The providing may be carried out upon user action. The computing generally (but not always) includes discretizing the one or more equations of the at least one physics model according to the at least one grid and/or the at least one time step. The discretizing may be done by using any known numerical method.

A simulation, global or local, comprises simulation states (which may be referred to as "states" in the following, for the sake of simplicity). A state is a representation, at a given time, of a physics state of a physics system of which a behavior in time is simulated by the simulation. For instance, a physics state may be any physical quantity at a given time. A physics quantity (also referred to as physical quantity) is a physical property of a phenomenon, body, or substance that can be quantified by measurement. A physical quantity may be, but is not limited to, Length, Mass, Time, Electric current, Temperature, Amount of substance, Luminous intensity, Absement, Absorbed dose rate, Acceleration, Angular acceleration, Angular momentum, Angular speed (or angular velocity), Area, Area density, Capacitance, Catalytic activity, Catalytic activity concentration, Chemical potential, Crackle, Current density, Dose equivalent, Dynamic viscosity, Electric charge, Electric charge density, Electric displacement, Electric field strength, Electrical conductance, Electrical conductivity, Electric potential, Electrical resistance, Electrical resistivity, Energy, Energy density, Entropy, Force, Frequency, Fuel efficiency, Half-life, Heat, Heat capacity, Heat flux density, Illuminance, Impedance, Impulse, Inductance, Irradiance, Intensity, Jerk, Jounce (or snap), Kinematic viscosity, Linear density, Luminous flux (or luminous power), Mach number (or mach), Magnetic field strength, Magnetic flux, Magnetic flux density, Magnetization, Mass fraction, (Mass) Density (or volume density), Mean lifetime, Molar concentration, Molar energy, Molar entropy, Molar heat capacity, Moment of inertia, Momentum, Permeability, Permittivity, Plane angle, Power, Pressure, Pop, (Radioactive) Activity, (Radioactive) Dose, Radiance, Radiant intensity, Reaction rate, Refractive index, Reluctance, Solid angle, Speed, Specific energy, Specific heat capacity, Specific volume, Spin, Strain, Stress, Surface tension, Temperature gradient, Thermal conductivity, Torque, Velocity, Volume, Volumetric flow, Wavelength, Wavenumber, Wavevector, Weight, Work, Young's modulus. A state may also be a vector of physical quantities. A simulation typically comprises an initial time and a final time, and at least one time step that is/are comprised between the initial time and the final time. There is one state for each time step, including the initial time and the final time.

Computing a simulation means that all simulation results are computed, a simulation result being data containing information representing a state. Thus, computing a simulation means that substantially all the information representing all states at all times is computed. A simulation of the invention can be computed by using any known numerical method and/or any existing computer program that is able to export and/or display simulation results at different time steps.

The method comprises creating S0 a database of local simulation instances.

The creating S0 comprises providing S10 a set of local simulations.

Each local simulation of the set of local simulations is already computed. In examples, the providing S10 includes loading and/or accessing (e.g. in a database) the set of already computed local simulations. Providing S10 thus means that data of the set of local simulations is made available to the system that performs the method, e.g. they are loaded in a memory of the system (e.g. a volatile memory) or can be retrieved by the system from a memory (e/g/ a non-volatile memory. In examples, the providing S10 may be preceded by the computing of each local simulation of the set and the storing of the results of the computations in a database. In all cases, at the providing S10, all local simulations of the set are already computed, which means that all simulation results of all local simulations are available, e.g. can be used to run and/or display the local simulations and/or to compute their respective reduced models. The set of local simulations comprises at least one local simulation.

Each local simulation is a physics simulation that is part of the global physics simulation and that can be computed alone and independently of the global physics simulation. As already said, the local simulations are not sufficient for performing the computation of the global computation.

A local simulation is part of the global physics simulation when computing the global physics simulation requires using results and/or data derived from results obtained during the computing of the local simulation. A local simulation can be computed alone and independently of the global physics simulation when computing the local simulation does not require using any results and/or any data derived from results obtained during the computing of the global physics simulation. In other words, each local simulation represents an independent sub-simulation (or a local part) of the global physics simulation. In examples, a local simulation is part of the global physics simulation when the local simulation is modelized by at least one physics model that is also used to model the global physics simulation. In these examples, it is meant by "computed alone and independently" that the at least one physics model can be solved and/or discretized and/or approximated and/or computed without solving and/or discretizing and/or approximating other physics models intervening in the modelling of the global physics simulation. In other words, the at least one physics model is self-consistent and/or self-sufficient to run and/or compute the local simulation. In these examples, there may be at least one other physics model that intervenes in the modelling of the global physics simulation and that takes as input and/or parameter results and/or data derived from results of the solving and/or the discretizing and/or the approximating of said at least one physics model.

For the sake of illustrating the definitions of local and global simulations, a non-limiting example is now given. It is the example of the simulation of a wind farm comprising wind turbines. The global physics simulation is the whole behavior of the wind farm in given wind conditions. Each local simulation simulates the behavior of one wind turbine alone in given wind conditions. Computing the simulation of the whole behavior of the wind farm requires computing of the simulation of the behavior of each wind turbine of the farm. However, computing one simulation of one behavior of one wind turbine can be done without simulating the whole wind farm.

The creating S0 of the database of local simulation instances comprises, for each local simulation of the set of local simulations, computing (S30) a respective reduced model of the local simulation.

A reduced model of a computed simulation is a model computed from the simulation by using Reduced Order Modeling techniques. Reduced order Modeling (ROM) techniques are techniques that reduce the dimensionality and computational complexity of mathematical models. A ROM (hereinafter, reduced model) is built from high-fidelity simulations (e.g. computed full simulations) and can subsequently be used to generate simulations for lower computation. One example of ROM methods is Galerkin projection (see for instance Rowley, Clarence W., Tim Colonius, and Richard M. Murray. "Model reduction for compressible flows using POD and Galerkin projection." Physica D: Nonlinear Phenomena 189.1-2 (2004): 115-129. and Barone, Matthew F., et al. "Reduced order modeling of fluid/structure interaction." Sandia National Laboratories Report, SAND No 7189 (2009): 44-72.), which is particularly popular for fluid dynamics. The Galerkin projection method uses Proper Orthogonal Decomposition (POD) to reduce the dimensionality of flow simulations and then finds the dynamics on this reduced space. There are other methods that build on this such as reduced basis methods and balanced truncation (see for instance Veroy, K., and A. T. Patera. "Certified real-time solution of the parametrized steady incompressible Navier-Stokes equations: rigorous reduced-basis a posteriori error bounds." International Journal for Numerical Methods in Fluids 47.8-9 (2005): 773-788. And Rowley, Clarence W. "Model reduction for fluids, using balanced proper orthogonal decomposition." Modeling And Computations In Dynamical Systems: In Commemoration of the 100th Anniversary of the Birth of John von Neumann. 2006. 301-317.). Generally speaking, ROM computes, from states of a computed full simulation, a basis that represents the main components of the simulation, using techniques such as POD or Single Value Decomposition (SVD). The SVD provides a way to factorize a matrix into singular vectors and singular values. The SVD allows to discover some of the same kind of information as the eigen decomposition and can for instance represent the main components of a mechanical system. Also known is "*Model Order Reduction*", Francisco Chinesta, Antonio Huerta, Gianluigi Rozza and Karen Willcox, Encyclopedia of Computational Mechanics. Edited by Erwin Stein, René de Borst and Thomas J. R. Hughes, 2004. The computing of a reduced model according to the method uses any techniques of ROM, such as the ones described in the references hereabove. The reduced model of a simulation of the invention may also be called a surrogate model of the simulation.

Each respective computed reduced model of each computed local simulation comprises a basis with elements.

These elements of the basis may be called basis elements hereinafter. A basis element is a component of the factorization computed from the full local simulation data. A basis element may also be called a state mode. In examples, the basis elements are energy modes of a physics system simulated by the local simulation. Each state of the local simulation can be generated at any time by a linear combination of a finite number of state modes. The linear combination approximates the state and may be called a reduced state.

The basis may be written $B=(e_1; e_2; \ldots e_n)$, where the $e_i$ are the basis elements. Any state state(t) can be approximated at time t by its reduced state PState(t) that is a linear combination of these basis elements as follows:

$$PState(t)=w_1(t)*e_1+w_2(t)*e_2+ \ldots +w_n(t)*e_n \qquad \text{(formula (1))}.$$

Here, the $w_i$ are the weights of the contribution of each basis elements used to compute the reduced state PState(t). The basis B is kept constant over time, and only the weights may evolve in time. Updating the weights in time make the simulation results, advance in time. Computing the reduced model of a simulation includes computing all elements of the basis B and all weights at all times t that are time steps comprised between the initial time and the final time of the simulation. Thus, once the reduced model is computed, any reduced state PState(t) representing any state state(t) of the computed simulation at any time step t is available, by using formula (1).

Figure 13:
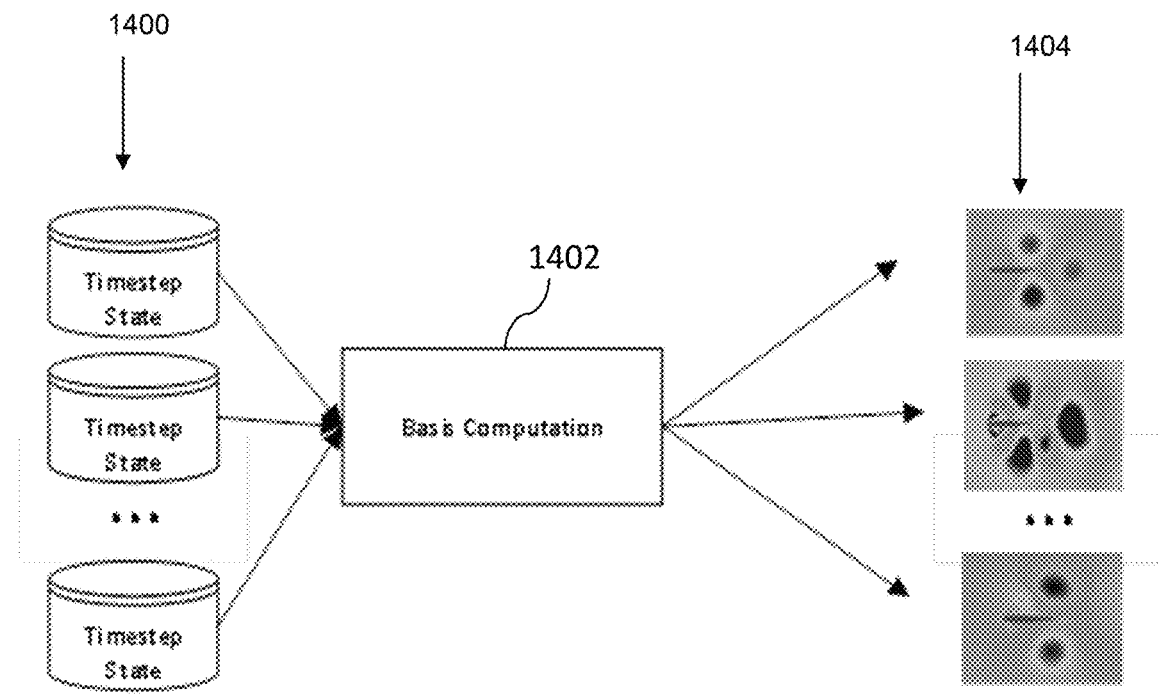
FIG. 13 shows a diagram illustrating an example of the computing of the reduced model.
Figure 14:
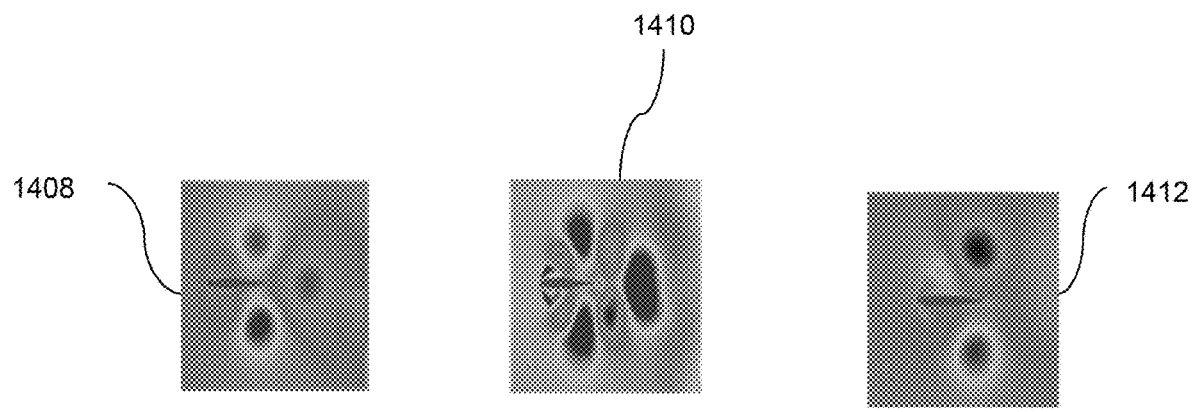
FIG. 14 shows examples of basis elements.

FIG. 13 is a diagram illustrating an example of the computation of the reduced model. The computation takes as inputs the states 1400 of the computed full simulation at all time steps of the full simulation. The computation includes the computation 1402 of the basis, which is based on all the states 1400 of the computed full simulation. In the example of FIG. 13, the computed basis is a basis of snapshots 1404 of the computed full simulation. In other words, the basis elements are in this example snapshots of the computed full simulation. Three screenshots of snapshots 1408, 1410 and 1412 are illustrated in FIG. 14.

The creating S0 further comprises, for each local simulation of the set of local simulations, storing S50 in the database a respective local simulation instance. The respective local simulation instance comprises the respective computed reduced model.

A local simulation instance of a local simulation forms data representing the local simulation. It comprises the respective computed reduced model of the local simulation. The local simulation instance may further comprise data relative to the local simulation, such as states (and/or data derived from states) of the local simulation and/or simulation results (and/or data derived from simulation results) of the local simulation. Generally speaking, the expression "instance of a simulation" means a concrete occurrence of the simulation, so that the system performing the method owns an example of the simulation. The database of local simulation instances may also be a library of local simulation instances.

A non-limiting example illustrating the definition of local simulation instance would be the following: the local simulation is the simulation of a wind turbine in given wind conditions. The local simulation instance forms data that represents the simulation of the wind turbine, as it comprises the computed reduced model of the computed simulation of the wind turbine in given wind conditions and, possibly, data relative to the computed simulation of the wind turbine in given wind conditions.

The method further comprises selecting S1 at least two local simulation instances in the database of local simulation instances.

The selecting S1 of at least two local simulation instances in the database of local simulation instances may be performed upon user action. Typically, a user accesses the database of local simulation instances and selects S1 local simulation instances. It is to be understood that one local simulation instance may be selected S1 at least twice (i.e. twice or more), in which case the at least two local simulation instances comprises at least two exemplars of the same local simulation instance.

The method further comprises computing S2 the global physics simulation. The computing S2 of the global physics simulation comprises reusing S220 each respective computed reduced model comprised in each local simulation instance of the selected at least two local simulation instances.

Reusing S220 a computed reduced model of a local simulation during the computing S2 of the global physics simulation comprises using, in the computations, one or more reduced states of the computed reduced model of the local simulation and/or data derived from one or more reduced states of the computed reduced model of the local simulation. In examples, simulation states of at least one local simulation of the selected at least two local simulation instances and/or data derived from these simulation states may normally form input(s) and/or parameter(s) and/or boundary condition(s) of one or more physics models that intervene in the modelling of the global physics simulation, e.g. at different time steps. In these examples, reusing S220 each respective computed reduced model means that reduced states of the at least one local simulation and/or data derived from these reduced states replace the simulation states and/or the data derived from these simulation states when forming input(s) and/or parameter(s) of said one or more physics models.

It is to be understood that, although each local simulation of the set of local simulations is a part of the global physics simulation, the computing S2 of the global physics simulation does not necessarily comprise reusing all respective computed reduced models of all local simulations. In other words, during the computing S2 of the global physics simulation, there may be independent local parts of the global physics simulation that are still computed without being replaced by a respective reduced model of a corresponding local simulation. However, there is at least two independent local parts (corresponding to the selected at least two local simulation instances) that are replaced by two respective reduced models.

In examples, the global physics simulation is associated with a global domain and each local simulation is associated with a respective local domain. In these examples, the method further comprises, before the computing S30 of each respective reduced model of each local simulation, selecting S20 a respective zone of interest of the local simulation. The respective zone of interest is a non-empty sub-domain of the respective local domain. In these examples, at the computing S30 of each respective reduced model of each local simulation; each respective reduced model is computed at the border of the respective zone of interest. In these examples, the method further comprises, at the computing S2 of the global physics simulation, placing S210 the respective zone of interest of each local simulation of the selected at least two simulation instances in the global domain. Only the remaining part of the global domain is computed. The remaining part is a part of the global domain that is occupied by no zone of interest. The global domain comprises regions that are respectively occupied by each respective zone of interest of each local simulation of the selected at least two local simulation instances.

A simulation domain is typically meshed or discretized. For some physics simulations (e.g. large scale physics simulation), the meshing of the simulation domain may be tricky and, multiscale issues may be encountered and solved. Multiscale issues typically refer to the case where local parts of the simulation domain need to be meshed at different scales, e.g. with different space discretization, than other parts of the simulation domain. Typically, the global physics simulation may require a certain meshing of the global domain, and each local simulation of the set of local simulations may require (e.g. respectively) a different meshing of each respective local domain. One must then compute the global physics simulation and/or adapt the physics modelling according to these different meshes. As a result, computing S2 the global physics simulation may be costlier in terms of time and/or resources of computation. The invention circumvents these difficulties, because each part of the global domain which is occupied by a respective zone of interest is not computed. The computed respective reduced models at the borders of these zones of interest are reused, and thus only the meshing of the remaining part of the global domain is involved in the computing of the global physics simulation. The invention thus avoids or significantly reduces multiscale issues.

In the invention, a domain (resp. a sub-domain) is a domain (resp. sub-domain) in its mathematical meaning. The border of a domain (resp. a sub-domain) is also to be understood in its mathematical meaning. The domains of the invention may be two-dimensional or three-dimensional domains. The local and global domains are simulation domains. A simulation domain is a domain that models a real-world physical region in which the physics phenomenon(s) to which the simulation pertains occur(s). Saying that a simulation is associated with a domain means that the domain is a simulation domain of the simulation. In examples, each respective local domain and the global domain are respectively meshed. The meshing may be performed upon user action, e.g. at an initial stage of the method. In examples, each respective local domain corresponds to (e.g. is equal to, is identical to) a respective sub-domain of the global domain. In these examples, each respective local domain may model the same real-world physical region than the respective sub-domain of the global domain that is a respective sub-region of the real-world physical region modelized by the global domain.

A non-limiting example illustrating the definitions of global and local domains is now discussed. The example relates to the previously discussed example of the simulation of a wind farm comprising wind turbines. The global domain is a three-dimensional volume modelling the wind farm in wind conditions. Each local domain is a three-dimensional volume encompassing a part (e.g. the totality) of one wind turbine and modelling the wind turbine and air surrounding the wind turbine.

The selecting S20 of the respective zone of interest, also called region of interest, of a local simulation may be performed automatically. In this case, said selecting S20 may be performed to fulfill one or more of the following criteria:

"Variations of scalar values on the respective local domain": in this case, since all simulation results and states of the computed local simulation are known, the method may, based on these results and states, compute and/or identify the variations of one or more scalar values related to the local simulation on the respective local domain, such as variations of an energy and/or exchanges of energy. The method may then automatically select the zone of interest according to these variations, for instance by selecting as zone of interest the smaller box in which all (or a predetermined significant part of) the variations are larger than a predetermined threshold and/or smaller than a predetermined maximum. The variations of the one or more scalar values may be computed from the state modes, e.g. from the energy modes when computing the variations of the energy or energy exchanges. Such criterion selects the respective zone of interest as the part of the respective local domain in which the essential part of a given physics phenomenon (e.g. energy exchanges) occur. The predetermined threshold and/or the predetermined maximum may be chosen upon user action, e.g. at an initial stage of the method.

"Smaller box around a solid": in this case, the local simulation simulates a physics phenomenon in which a solid such as a physical object or product is involved. The respective local domain typically encompasses a representation (e.g. geometrical) of the solid, and the method then automatically selects S20 the smaller box encompassing the solid.

The selecting S20 of the respective zone of interest of a local simulation may also typically be performed to fulfill any plausible combination of the above criteria. The method may for instance select the respective zone of interest such that the latter encompasses both a solid comprised in the local domain and significant variations of a scalar (e.g. a physical quantity such as an energy) around the solid. Additionally, the method may automatically prevent the selected respective zone of interest to be empty and/or too large (e.g. larger than the respective local domain and/or larger than the global domain).

In examples, the selecting S20 of the respective zone of interest of a local simulation may be performed upon user action. In these examples, it may be automatically forbidden to the user to select an empty and/or too large sub-domain. In examples, each local simulation may be displayed to the user, e.g. on a GUI, the user performing the selecting S20 by interacting (e.g. with a touch or a haptic device) with the GUI to select each zone of interest on each displayed local simulation.

An example of the selecting S20 upon user action of a respective zone of interest is now described with reference to FIG. 8 and FIG. 9. The user loads S10 a local simulation 82. The local simulation 82 is displayed with its respective local domain 84 in a window 80 of a GUI. Although FIGS. 9 and 10 are screenshots, it is to be understood that it may be a video, e.g. of the local simulation progressing in time, that is displayed within the window 80. By using a haptic device or a touch, the user forms the respective zone of interest 86 he/she wishes to select within the respective local domain 84. The polyline 90 represents the border of the respective zone of interest 86. The user may form the respective zone of interest 86 by forming its border, here the polyline 90.

In examples, each respective reduced model of each local simulation is computed S30 at the border of the respective zone of interest. Computing S30 a respective reduced model at the border of a respective zone of interest comprises computing the reduced states of the corresponding local simulation on or substantially on the border of the respective zone of interest. For example, all reduced states of the corresponding local simulation may be computed, but only those on or substantially on the border of the respective zone of interest may be kept. Reduced states in the interior of the respective zone of interest are in such cases not kept. Reduced states computed at the border of a respective zone of interest occupying a region of the global domain suffice to compute S2 the global physics simulation at the interface between the region occupied by the respective zone of interest and the remaining part of the global domain. This allows simulating and/or computing of the remaining part without recomputing the occupied region. In examples, it is indeed sufficient, in order to model and/or simulate and/or approximate and/or compute communications and/or interfacings and/or exchanges between occupied regions and the remaining part of the global domain, to use reduced states computed at the border of the occupied regions in the computations.

Placing S210 a respective zone of interest in the global domain comprises replacing a region of the global domain by the respective zone of interest. The placing S210 may be performed upon user action. In examples, the respective zone of interest is displayed, e.g. on a GUI, and the user moves (or displaces) the respective zone of interest in the global domain which is also displayed nearby. The move of the respective zone of interest may be performed by interacting with the GUI, e.g. using a touch or a haptic device. For instance, the user performs a drag and drop operation, as known in the art. Upon the respective zone of interest being moved into the global domain, the method may automatically replace the region of the global domain on which the respective zone of interest has been moved by the respective zone of interest. In case several respective zones of interest are placed during the placing S210 of respective zones of interest, the method may automatically prevent any overlapping of zones of interest. In examples, the user enters, e.g. by using a keyboard, where the respective zone of interest is to be placed in the global domain.

Figure 11:
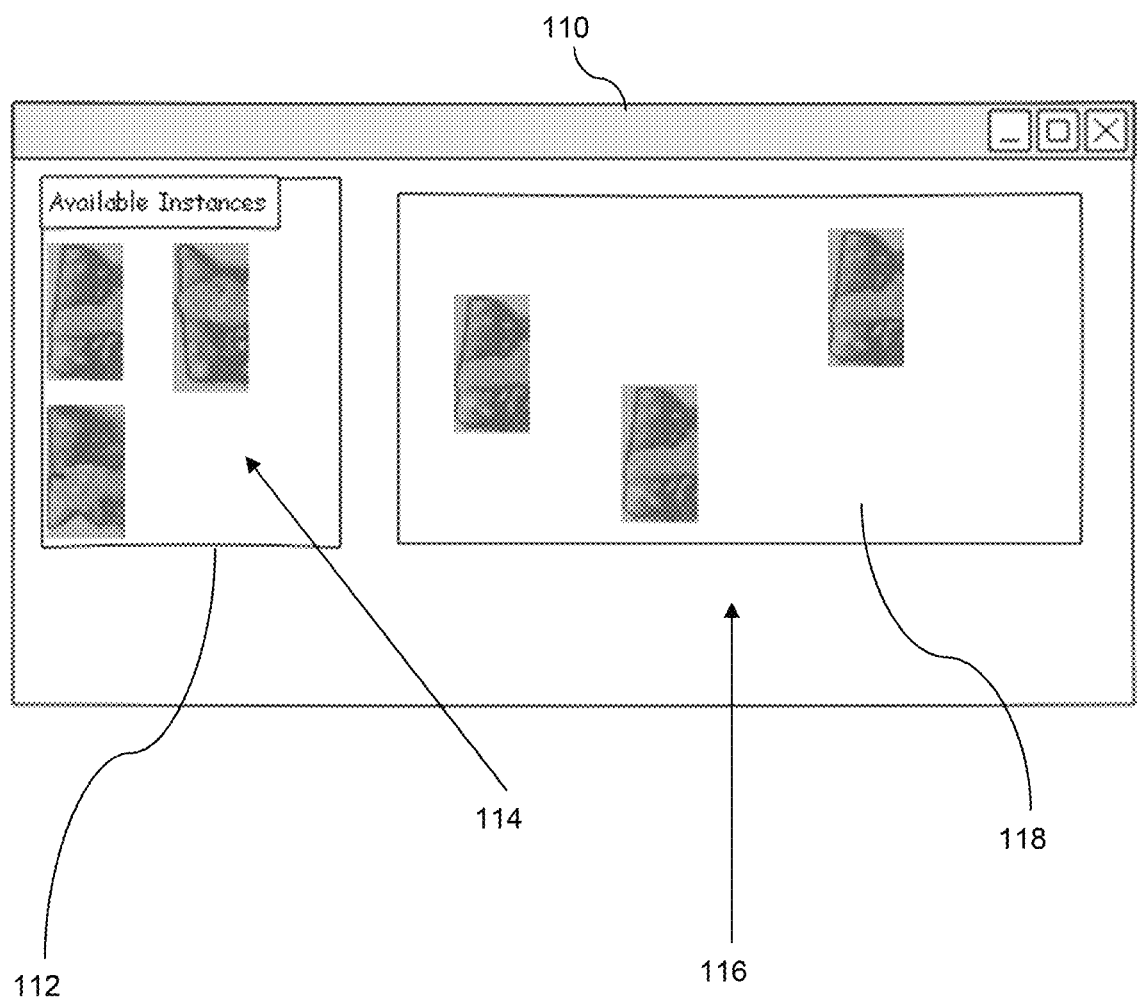
FIG. 11 shows a screenshot illustrating an example of placing respective zones of interests.

It is now discussed an example of the placing S210 of respective zones of interest with reference to FIG. 11. In this example, a window 110 is displayed to the user, e.g. on a GUI. A frame 112 within the window 110 comprises three previously selected respective zones of interest 114 of three local simulations. One of the respective zones of interest may be the respective zone of interest 96 of FIG. 9. Although FIG. 11 is a screenshot, it is to be understood that it may be videos, e.g. of each respective zone of interest of each local simulation progressing in time, that are displayed within the window 110. The user moves each respective zone of interest he wishes to place in the global domain 118 of a global physics simulation 116, the global domain being displayed within the window 110, and thereby places the respective zone of interests where he/she desires. One respective zone of interest may be moved multiple times. The remaining part, that is the part of the global domain 118 occupied by no respective zone of interest, is the only part of the global domain 118 that is computed at the computing S2 of the global physics simulation.

By "only the remaining part of the global domain is computed" it is meant that only simulation states and/or results of the global physics simulation in the remaining part are computed.

Figure 6:
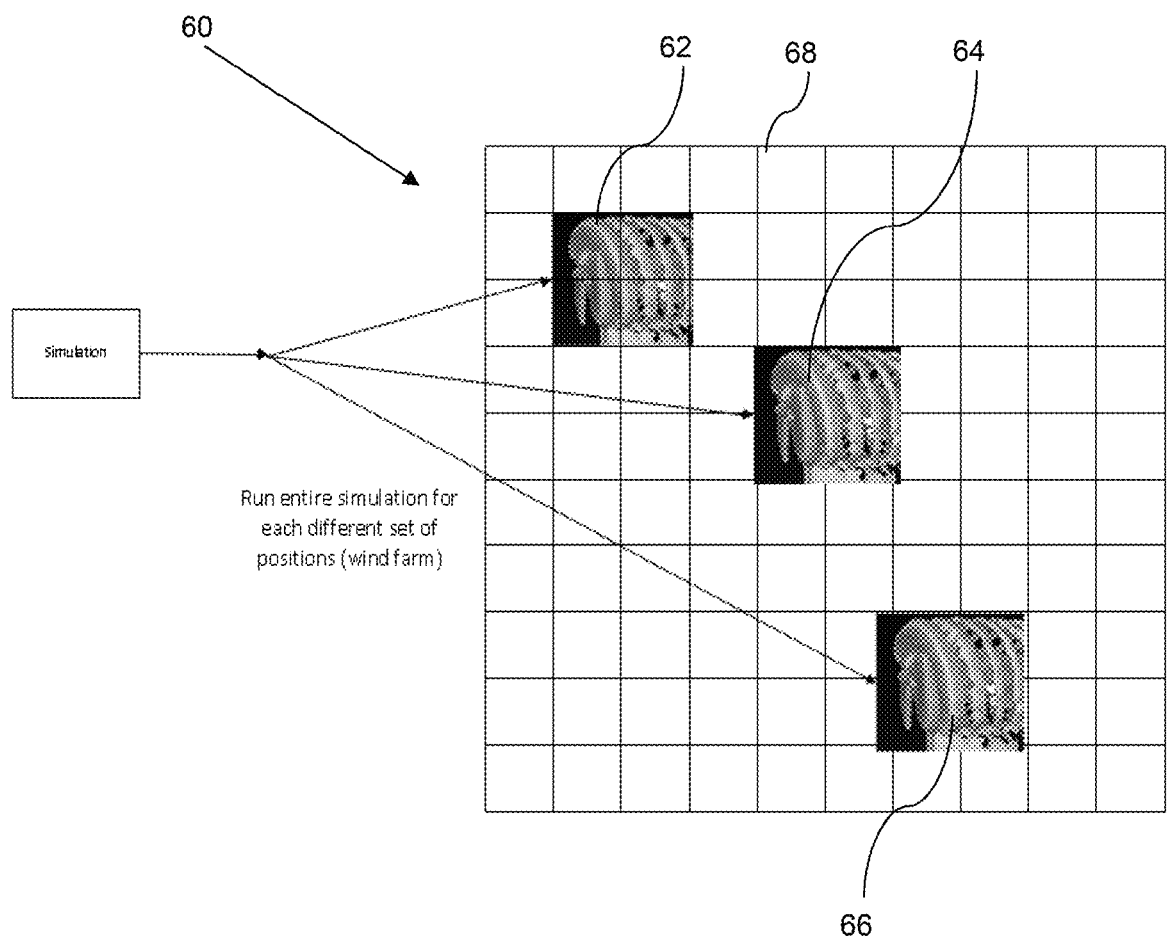
FIG. 6 illustrates an example of simulating together a plurality of physics simulation instances according to a method of the prior art.
Figure 7:
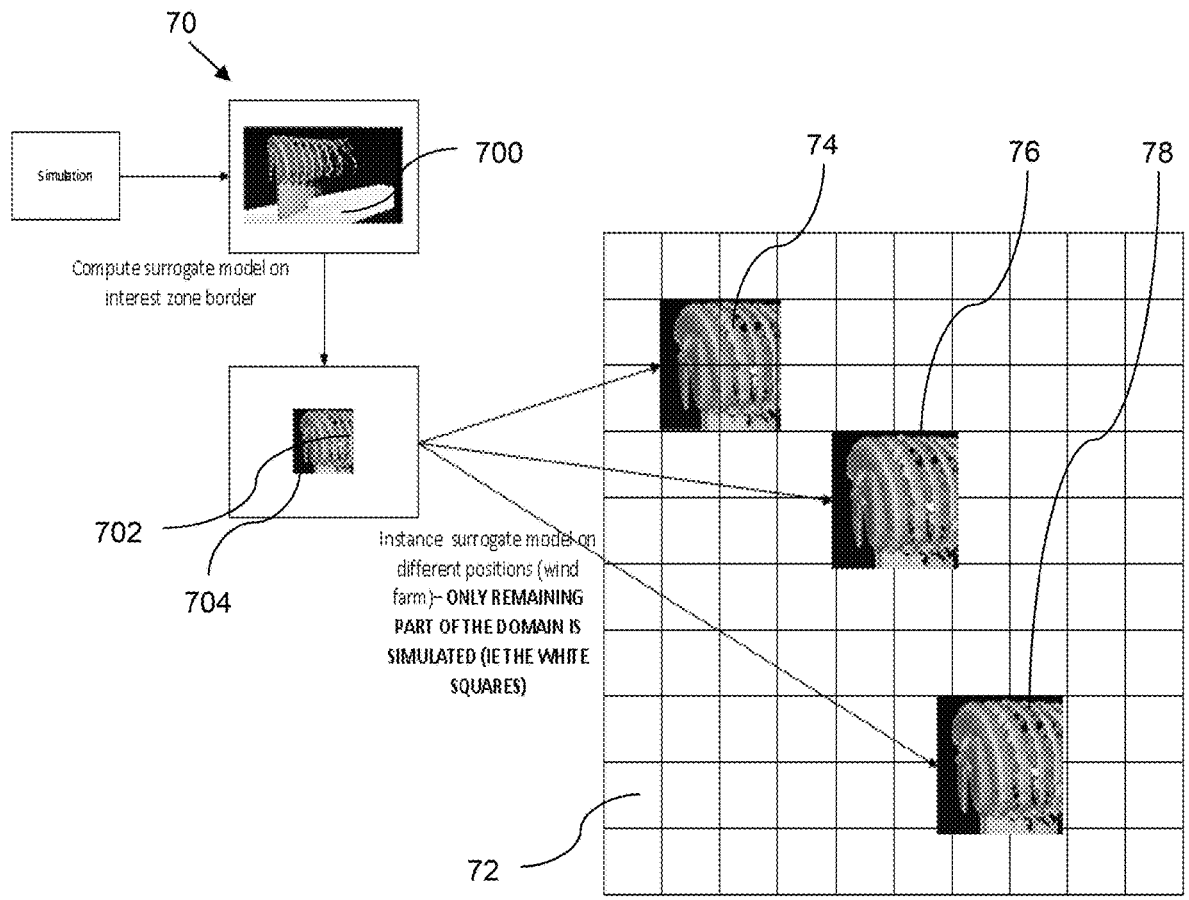
FIG. 7 illustrates an example of simulating together a plurality of physics simulation instances according to the method.

With reference to FIG. 6 and FIG. 7, it is now discussed a comparison between an example of simulating together a plurality of physics simulation instances according to a method of the prior art as shown in FIG. 6 and an example of simulating together a plurality of physics simulation instances according to the method of the invention as shown in FIG. 7. In both examples, one needs to simulate three wind turbines working in a wind farm in given wind conditions.

In the example of the prior art in FIG. 6, one needs to fully run the simulation 60 that includes three simulations 62, 64 and 66 of a given wind turbine. Each simulation 62, 64 and 66 of a given wind turbine is fully computed. When at least one of the simulations 62, 64 and 66 of a given wind turbine is moved in the domain 68 of the simulation 60, then the simulation 60 has to be fully computed again, which includes fully computing each simulation 62, 64 and 66 of a given wind turbine again.

In the example of the method in FIG. 7, the user loads, during the creating S0 of a database of local simulation instances, a local simulation 70 of a wind turbine in given wind conditions. The local simulation is associated with a respective local domain 700. The method selects S20 the respective zone of interest 702 of the local simulation 70. Here, the selecting S20 of the respective zone if interest is carried out upon user action, e.g. according to the examples of FIG. 8 and FIG. 9 described above. The respective reduced model of the local simulation 70 is computed S30 at the border 704 of the respective zone of interest 702 and is comprised in a local simulation instance corresponding to the local simulation 70, the local simulation instance being stored in the database of local simulation instances. At the selecting S1 of at least two local simulation instances, the local simulation instance corresponding to the local simulation 70 is selected thrice by the user. The user places S210 three exemplars 74, 76 and 78 of the respective zone of interest of the local simulation 70 in the global domain 72 of the global physics simulation (that is, the simulation of the wind farm comprising the three wind turbines working in wind conditions). Only the remaining part of the global domain 72, that is the part occupied by no zone of interest, is computed at the computing S2 of the global physics simulation. Advantageously, there is no need to re-run the very costly simulation of a wind turbine region.

In examples, the method comprises, at the placing S210 of the respective zone of interest of each local simulation of the selected at least two local simulation instances, interfacing the border of the respective zone of interest with the border of the region of the global domain occupied by the respective zone of interest.

The interfacing comprises a modification or a series of modifications of at least one algorithm and/or numerical method pertaining to the computing of the global physics simulation. The interfacing thereby incorporates the respective zone of interest and the respective reduced model computed at the border of the respective zone of interest in the at least one algorithm and/or numerical method, which allows the computation of the global physics simulation by reusing the respective reduced model(s). The modification or the series of modifications may be performed automatically, e.g. upon the user dragging the respective zone of interest in the global domain. The modification or the series of modifications may also be performed upon user action, e.g. by interacting with a keyboard and/or a haptic device.

An implementation of the interfacing is now discussed with reference to FIG. 15.

Figure 15:
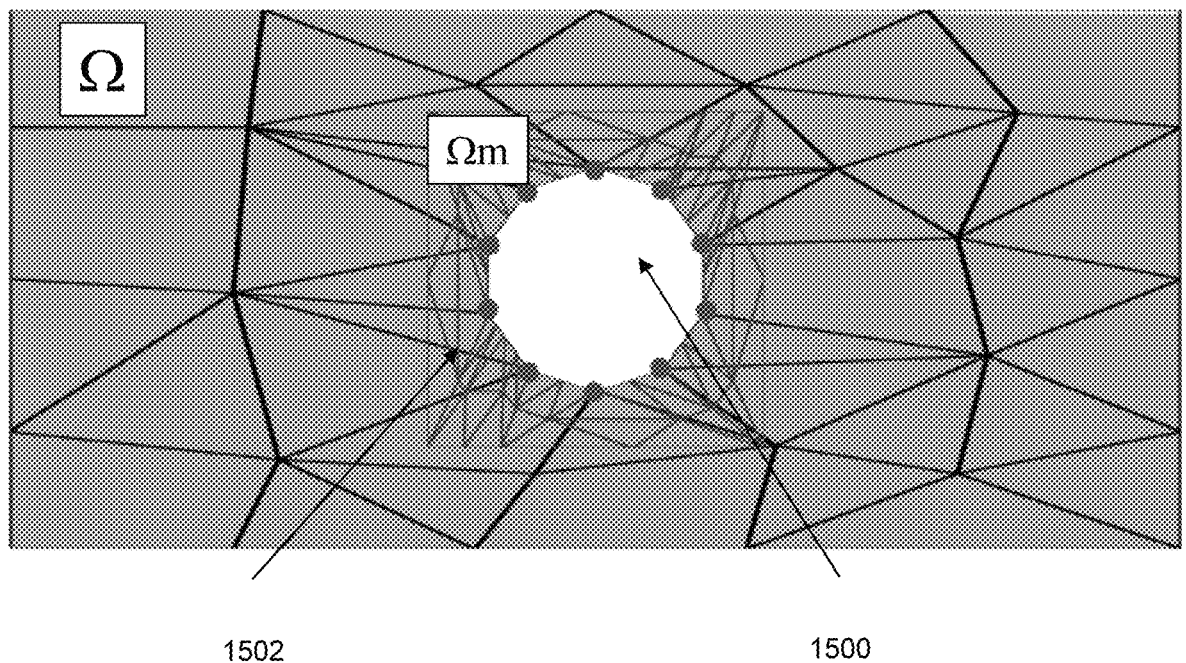
FIG. 15 illustrates an implementation of the interfacing.

FIG. 15 shows the global domain $\Omega$ of the global simulation and the local domain $\Omega m$ of a local simulation of the at least one local simulation. In this implementation, the global domain $\Omega$ and the local domain $\Omega m$ are respectively (e.g. differently) discretized. FIG. 15. shows the respective zone of interest 1500 of the local domain $\Omega m$, illustrated by the white area. In this implementation, the local domain $\Omega m$ comprises a recovery area 1502, which is the region of the local domain Ωm not occupied by the zone of interest 1500.

In this implementation, the interfacing is based on correspondence points of the discretization of Ω with the zone of interest 1500. The correspondence points are points located at or substantially at the border of the zone of interest 1500. The correspondence points are illustrated as bullet points one FIG. 15. This is only an illustration, for the sake of clarity, but the correspondence points are not necessarily bullet points. In this implementation, reduced states of the local simulation are computed on or substantially on the correspondence points and on or substantially on the recovery area 1502. The interfacing then comprises verifying a coherence between the reduced states computed on or substantially on the correspondence points and the reduced states computed on or substantially on the recovery area 1502. Verifying a coherence may comprise determining whether physical quantities (such as an energy or a displacement) of the reduced states computed on or substantially on the correspondence points and physical quantities of the reduced states computed on or substantially on the recovery area 1502 are homogeneous or not. When it is determined that the physical quantities are homogeneous, then the interfacing may incorporate the zone of interest 1500 and the computed reduced model computed at the correspondence points in the at least one algorithm and/or numerical method, as previously discussed.

Alternative implementations do not use the recovery area 1502. In these alternative implementations, the interfacing does not comprise the verifying of the coherence. In these alternative implementations, the interfacing may directly incorporate the zone of interest 1500 and the computed reduced model computed at the correspondence points in the at least one algorithm and/or numerical method, as previously discussed.

In examples, the method further comprises, for each local simulation of the set of local simulations, after the computing S30 of the respective reduced model, defining S40 probes. The probes are points of the respective local domain of the local simulation which are contiguous to the respective zone of interest. Each probe comprises simulation data of the local simulation. In these examples, the stored local simulation instance comprising the respective computed reduced model further comprises the probes and the respective zone of interest.

Defining S40 probes and storing them improves the accuracy of the computing S2 of the global physics simulation, because local simulation data is stored and may be used for the computing S2 in addition of the respective computed reduced models.

The simulation data comprised in a probe refers to any data derived from simulation results and/or simulation states of the local simulation to which the probe corresponds. Probes (e.g. all of them) may be coupled to the respective computed reduced model to be used in the computation at the reusing step S220 in addition of the computed reduced model itself. The simulation data may also comprise the simulation results and/or the simulation states. In examples, the probes are uniformly distributed on (or substantially on) the border of each zone of interest. This allows access of the same level of simulation data anywhere around the respective zone of interest.

The defining S40 of the probes may be performed semi-automatically, e.g. upon the selecting S20 of the respective zone of interest, in which case the method may automatically create a uniform distribution of probes along the border of the respective zone of interest. In these examples, the user may then select and/or derive and/or retrieve the simulation data and record it on the probes Alternatively, the user may select the locations of the probes and then select and/or derive and/or retrieve the simulation data and record it on the probes. In any case, the defining S40 of the probes comprises the creation of the probes and the selecting and/or the deriving and/or the retrieving of the simulation data and the recording of the simulation data on the created probes.

In examples, the probes and the respective zone of interest are stored at the storing step S50. In examples, the number of probes by zone of interest is larger than a predetermined threshold, e.g. chosen upon user action at an initial stage of the method. This ensures to fulfill a certain requirement of accuracy. Indeed, the more there are probes, the more there is simulation data to access and to use at the computing S2 of each global simulation, the better the accuracy of the computing S2.

Figure 8:
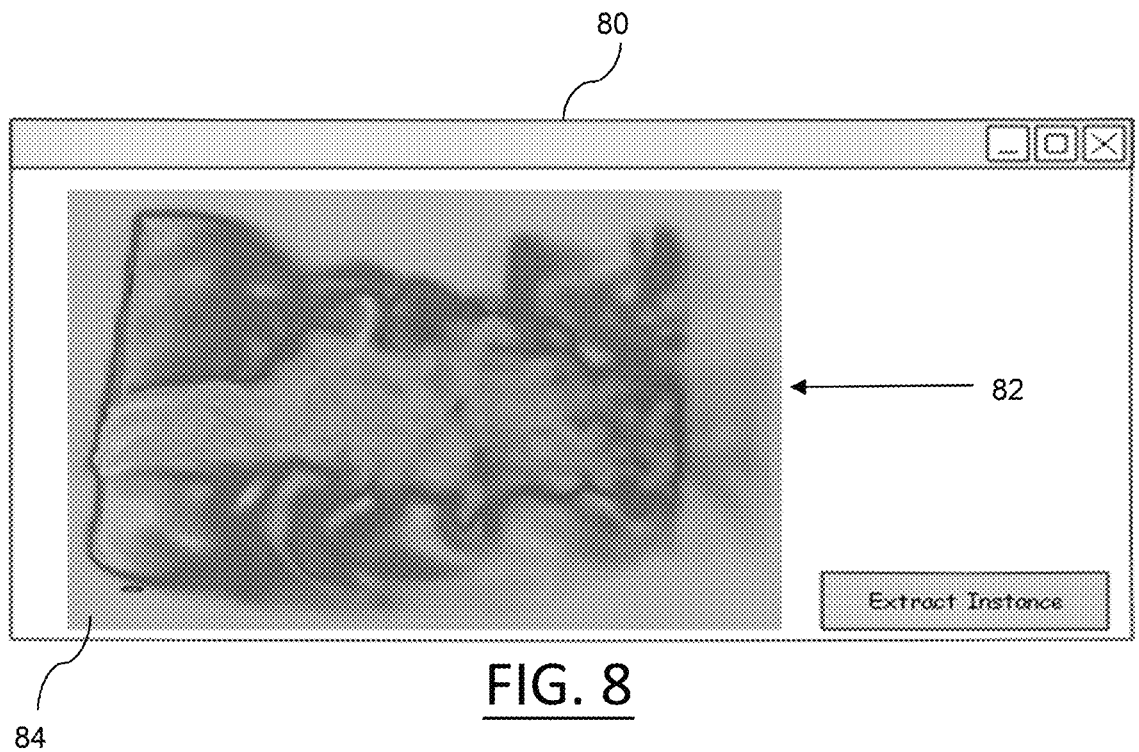
FIGS. 8-9 show two screenshots illustrating an example of the selecting of a respective zone of interest.
Figure 9:
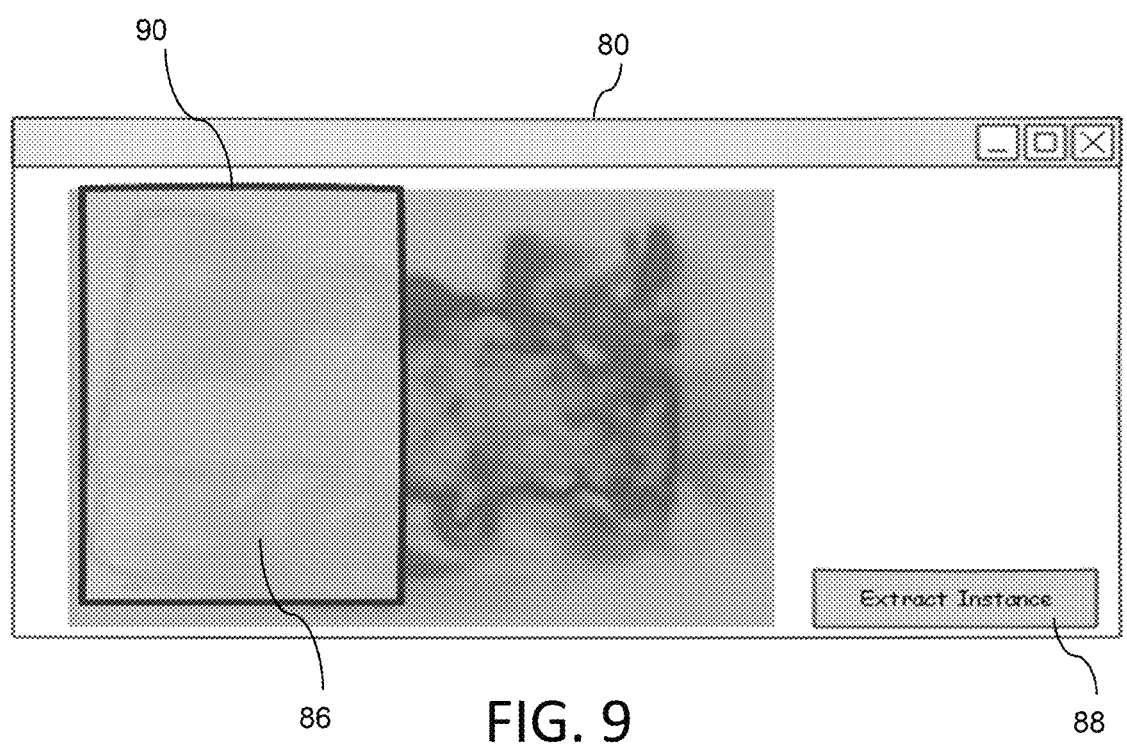
Figure 10:
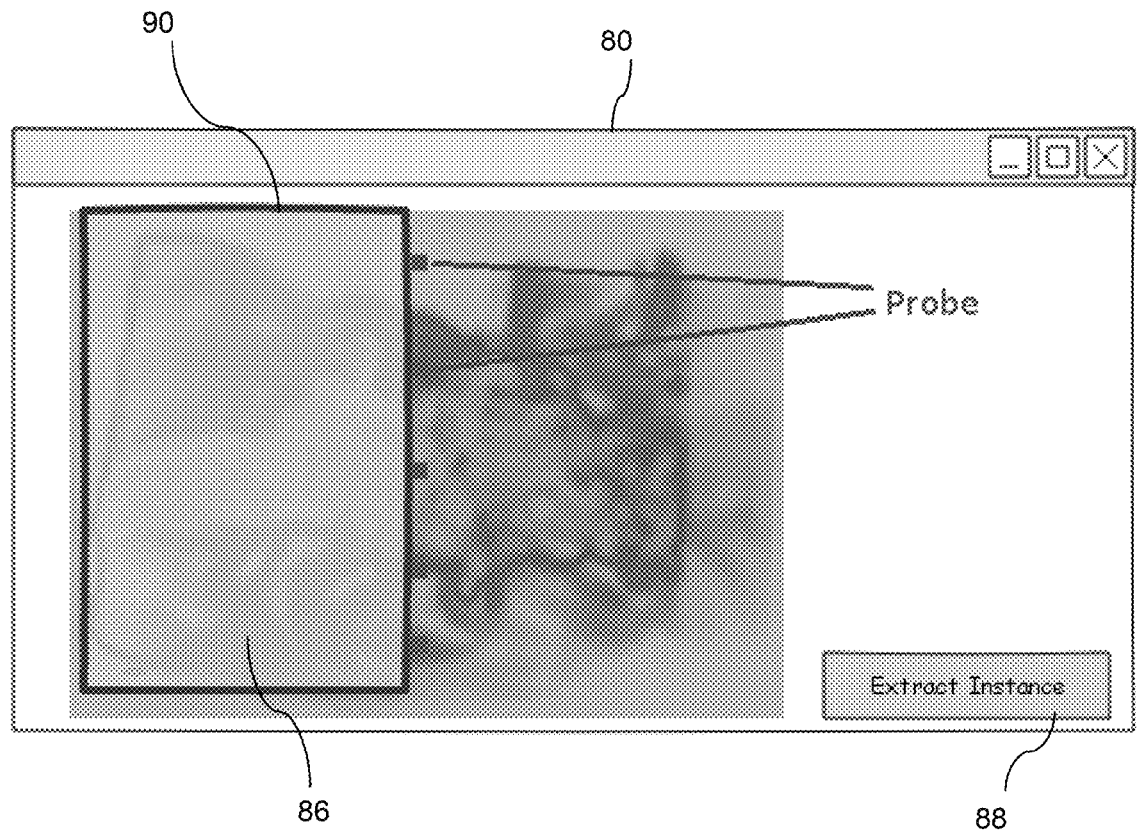
FIG. 10 shows a screenshot illustrating an example of defining the probes.

With reference to FIGS. 8, 9 and 10, an example of defining S40 probes is now described. In this example, the providing S10 of the local simulation 82 and the selecting S20 of the respective zone of interest 86 have been performed according to the examples of FIG. 8 and FIG. 9, described previously. After the selecting S20 of the respective zone of interest 86, the user defines S40 probes substantially on the border 90 of the respective zone of interest 86. For the sake of explanation only, the probes are represented by squares which are contiguous to the border 90 in FIG. 10. Defining S40 a probe may be performed by picking, e.g. upon user interaction with a GUI, the probe's emplacement, that is a point on (or substantially on) the border 90, and a square representing the probe is automatically created substantially at the picking location. The simulation data to be comprised in the probe may be then selected and/or retrieved and recorded in the probe.

Figure 12:
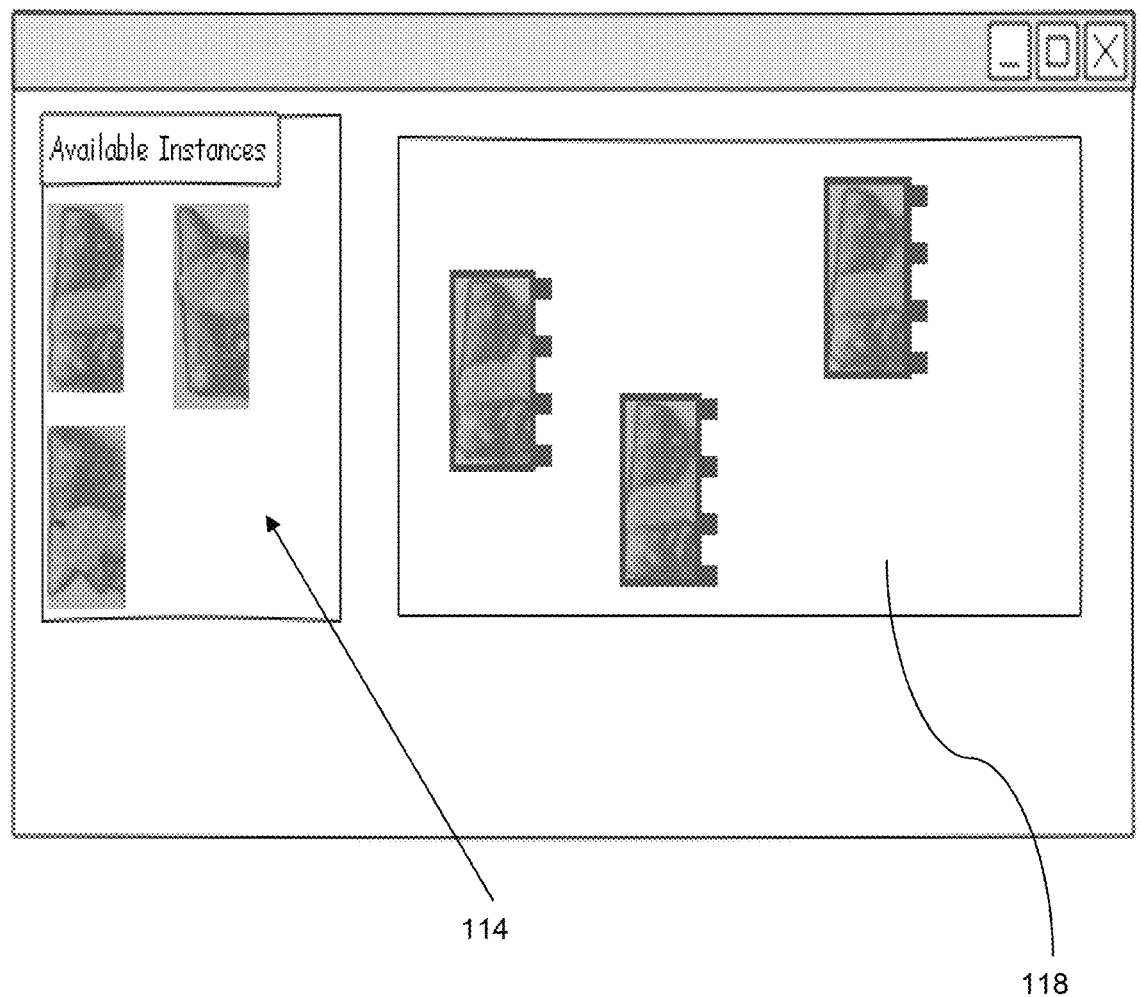
FIG. 12 shows a screenshot illustrating an example of placing respective zones of interests.

An example of the placing S210, in the case where probes have been defined for each local simulation instance, is now described with reference to FIG. 12. In specific, FIG. 12 shows the example of the placing S210 of respective zones of interest of FIG. 11, but with the difference that probes have been defined S40 on all respective zones of interest 114 according to the above example described with reference to FIGS. 8, 9 and 10. In FIG. 12, probes are displayed on the respective zones of interest that have been moved into the global domain 118.

Figure 4:
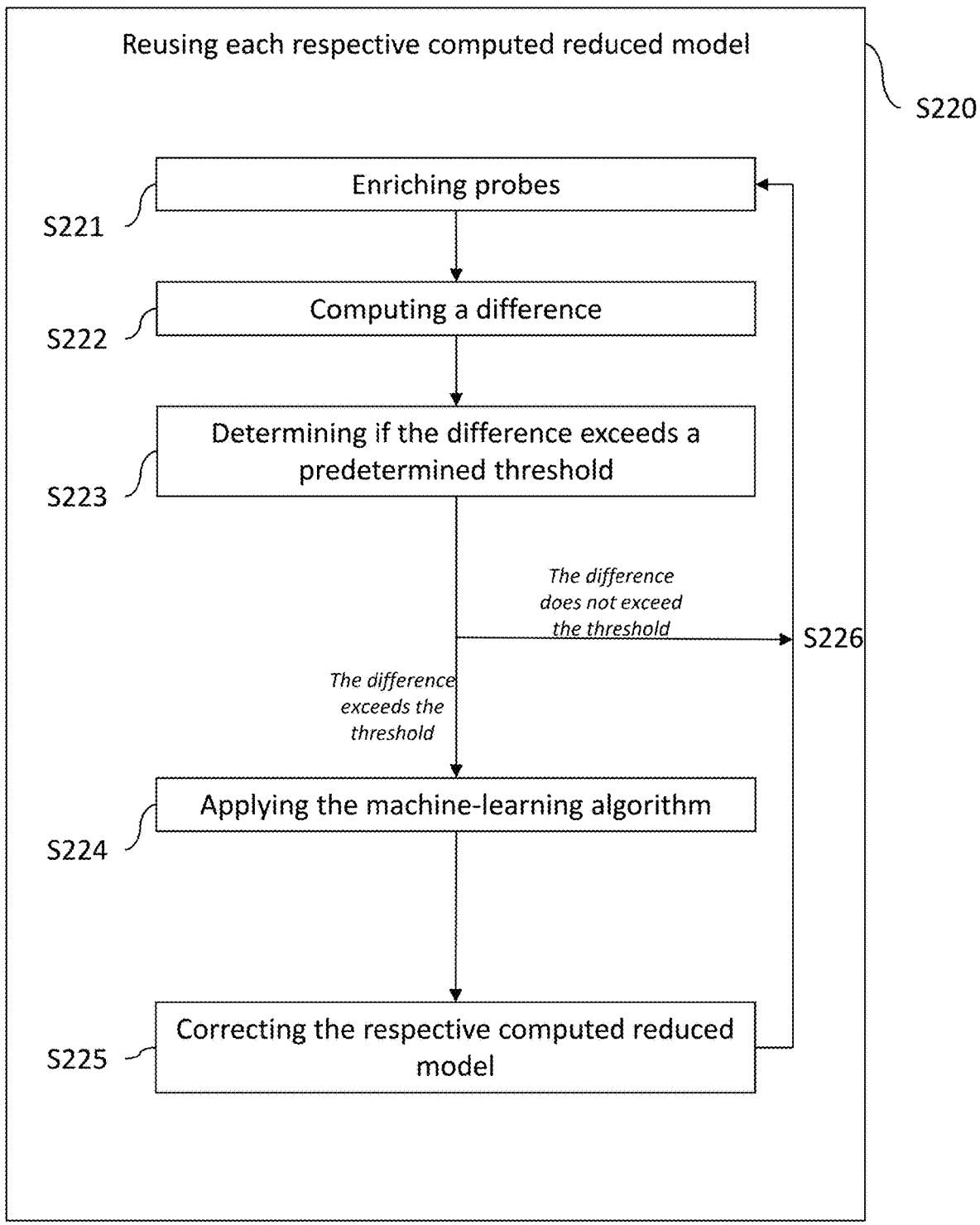
FIG. 4 shows a flowchart of an example of the reusing of each respective computed reduced model according to the method.

In examples, during the computing S2 of the global physics simulation, at least two local simulations instances of the at least two selected local simulation instances interact. The interaction results in that probes of at least one local simulation instance of the at least two local simulation instances are enriched S221. As a result of enriching S221 probes, the respective computed reduced model comprised in a local simulation instance of which probes are enriched is corrected S225, as shown in FIG. 4.

Interactions between local parts of the global physics simulation are thus taken into account by the method. These interactions may in fact correspond to (e.g. model) real physics interactions. Thus, the method allows simulating of the global physics simulation while simulating real-world interactions that may occur in the real-world. The resulting simulated global physics simulation is thus more accurate from the physics' point of view.

Two simulation instances interact when performing the reusing S220 of one respective computed reduced model of one of the two simulation instances necessitates to correct the respective computed reduced model of the other one of the two simulation instances to perform the reusing S220 of the respective computed reduced model of said other one of the two simulation instances, and/or conversely. In examples, the word "necessitates" is to be understood as "theoretically necessitates", which means that a correction of the respective computed reduced model of the other one of the two simulation instances is needed in theory. However, the method may determine that the interaction is sufficiently weak so that the theoretical correction is in fact not carried out by the method. This point will be detailed later.

An interaction between two local simulation instances, say a first local simulation instance and a second local simulation instance, results in that probes of at least one of the two local simulation instances, say the first local simulation instance, are enriched. Enriching probes means enriching one or more probes. Enriching a probe of the first local simulation instance may comprise adding simulation data to the probe, e.g. simulation data retrieved and/or derived from simulation data of at least one probe of the second local simulation instance. Alternatively or additionally, enriching the probe may comprise removing simulation data already comprised in the probe. Alternatively or additionally, enriching the probe may comprise modifying simulation data already comprised in the probe. It can be understood that, where appropriate, probes of the second local simulation instance or probes of both local simulation instances may be enriched similarly.

In examples, the probes of a local simulation instance are related to the respective computed reduced model of the local simulation instance and enriching one or more of the probes triggers (e.g. automatically) a correction of the respective computed reduced model, according to the relation. In examples, correcting S225 the respective reduced model means modifying its (or a part of its) reduced states, e.g. by modifying the (or a part of the) basis elements and/or the (or a part of the) weights, or by modifying the number of state modes contributing to said reduced states (or said part of said reduced states).

Referring back to the example of FIG. 12 described above, the probes of each local simulation instance are displayed on the zones of interest. In examples, the purpose of such a displaying is to help the user to place the respective zones of interest. Indeed, how the interactions between the local simulation instances are captured may depend on the number of probes and on their positions on each respective zone of interest. By displaying the probes, the user may thus perform the placing S210 of the respective zones of interest to capture the amount of interactions he truly wishes to simulate.

In examples, the method further comprises, for each local simulation instance of which probes are enriched, before the correcting S225 of the respective computed reduced model, computing S222 a difference between the set of all enriched probes and the set of corresponding probes before their enrichment. In these examples, the method further comprises determining S223 if the difference exceeds a predetermined threshold. In these examples, the method further comprises correcting S225 the respective computed reduced model if is determined that the difference exceeds the predetermined threshold. FIG. 4 illustrates such as the example of FIG. 4.

By conditioning the correcting S225 of the respective computed reduced model to the determination that the difference exceeds the predetermined threshold, the method only takes into account significant interactions. In examples, this means that the method only takes into account interactions that correspond to (e.g. simulate, model) real-world physical interactions and/or discards interactions that would be due to or correspond to numerical artefacts.

A difference may mean a gap or a discrepancy or an error. It may consist in one or more numerical values expressing how the enriched probes differ from the corresponding (i.e. the same) probes before their enrichment, e.g. how the simulation data of the enriched probes differ from the simulation data of the probes when they were not enriched. The determining S223 that the difference exceeds a predetermined threshold may be carried out automatically by the method. In examples, the predetermined threshold may be chosen upon user action, e.g. at an initial stage of the method.

If it is determined that the difference exceeds the threshold, then the method performs the correcting S225 of the computed reduced model. In examples, the correcting S225 of the computed reduced model may, e.g. in combination with other computations in the computing S2 of the global physics simulation, trigger a new enrichment S221 of probes. That is, the enrichment S221 and the correcting S225 may be iterated S226 during execution of the computing S2 of the global physics simulation. If the difference does however not exceed the threshold, then the computed reduced model is not corrected (that is, the computed reduced model is left unchanged). In examples, due to other computations in the computing S2 of the global simulation, a new enrichment S221 of probes may still be contemplated by the method. That is, the enrichment S221 and the determining S223 may be iterated S226 during execution of the computing S2 of the global simulation. In other words, during the computing S2 of each global simulation instance, the method may execute an iteration S226 of: the enriching S221 and the determining S223 and/or the enriching S221 and the correcting S223.

Figure 2:
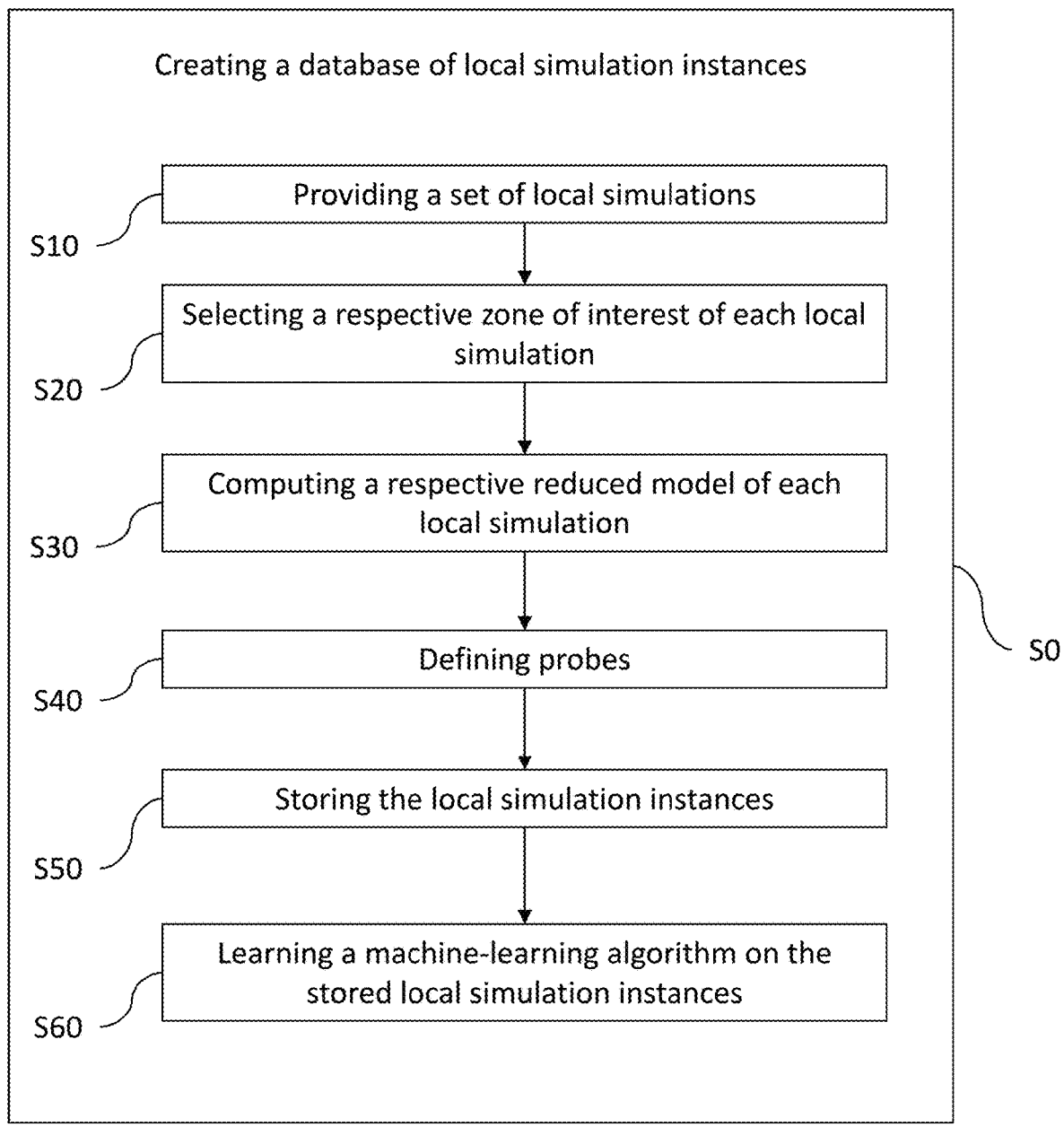
FIG. 2 shows a flowchart of an example of the creating of the database of local simulation instances according to the method.
Figure 3:
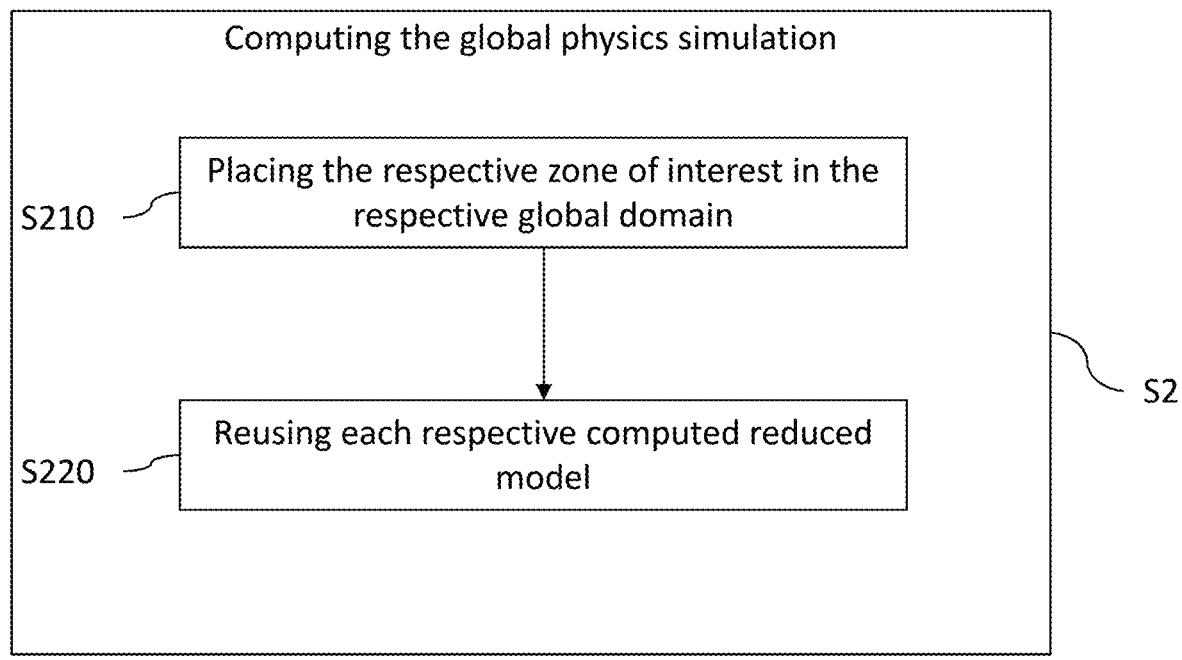
FIG. 3 shows a flowchart of an example of the computing of the global physics simulation according to the method.

In examples, such as the one illustrated on FIG. 2, the method further comprises, at the creating S0 of the database of local simulation instances, learning S60 a machine-learning algorithm. The machine-learning algorithm is learned S60 on the local simulation instances stored in the database. The machine-learning provides, for each local simulation instance of the database, a respective relation between the probes stored in the local simulation instance and the respective computed reduced model stored in the local simulation instance. In these examples, for each local simulation instance, correcting S225 the respective computed reduced model comprised in the local simulation instance comprises applying S224 the machine-learning algorithm. The correcting S225 is performed based on the respective relation.

The machine-learning algorithm acts as a tool to correct S225 a respective computed reduced model. It is learned at the creating S0 of the database and used, where appropriate, at the correcting S225. Thus, interactions are taken into account without the need of recomputing any local simulations, but with the use of information already learned on the computed local simulations.

The machine-learning algorithm may be learned by any known machine-learning technique. Learning on the local simulation instances stored in the database means that the database forms a learning set or a training set of the machine-learning algorithm. Thus, the learning or training set of the machine-learning algorithm comprises all reduced models, probes and zone of interest of all local simulations. The machine-learning algorithm may also be called a correction model.

For each local simulation instance, the respective relation comprises one or more mathematical formulae and/or one or more algorithms that provide a correspondence between the respective computed reduced model and the probes of the local simulation instance. In examples, the set of all respective relations form a decision forest of the machine-learning algorithm.

For each local simulation instance of which probes are enriched, correcting S225 the respective computed reduced model of the local simulation instance comprises applying S224 the machine learning algorithm only when it has been determined S223 that the difference exceeds the predetermined threshold. In examples, the machine-learning algorithm takes as inputs modes and/or weights (e.g. all of them) and/or data derived from modes and/or weights (e.g. reduced states, e.g. all reduced states) and probes (e.g. all probes, e.g. only the enriched probes) of the local simulation instance. In examples, these inputs are pushed through the set of all respective relations and the machine-learning algorithm outputs a correction of the respective computed reduced model. The correction may consist in a new respective computed reduced model comprising new weights and/or new state modes and/or weights of the non-corrected respective computed reduced model and/or state modes of the non-corrected respective computed reduced model.

In examples, at each correcting S225 of a respective reduced model as a result of the enriching S221 of probes, a simulation instance is stored in the database, the simulation instance comprising the corrected reduced model and the enriched probes.

As the result, the database is enriched with a new local simulation instance that comes from the computing S2 of the global physics simulation.

Referring back to FIG. 1, in examples, the method comprises, after the computing S2 of the global physics simulation, adding S3 a new local simulation instance to the database of local simulation instances. The adding S3 of the new local simulation instance comprises providing a new local simulation. The new local simulation is already computed and is associated with a respective local domain. The adding S3 of the new local simulation instance comprises selecting a respective zone of interest of the new local simulation. The respective zone of interest is a non-empty sub-domain of the respective local domain. The adding S3 of the new local simulation instance comprises computing a respective reduced model of the new local simulation at the border of the respective zone of interest. The adding S3 of the new local simulation instance comprises defining probes. The probes are points of the respective local domain which are contiguous to the respective zone of interest. Each probe comprises simulation data of the new local simulation. The adding S3 of the new local simulation instance comprises storing in the database a new local simulation instance. The stored new local simulation instance comprises the respective reduced model of the new local simulation, the probes of the new local simulation and the respective zone of interest of the new local simulation. The adding S3 of the new local simulation instance results in that the new local simulation instance is one of the local simulation instances of the database of local simulation instances. The method further comprises, after the adding S3 of the new local simulation instance, re-learning S4 the machine-learning algorithm on the database of simulation instance. The method further comprises re-selecting S5 at least two local simulation instances in the database of local simulation instances. The re-selected at least two local simulation instances comprise the new local simulation instance. The method further comprises re-computing S7 the global physics simulation with the re-selected at least two local simulation instances.

The method thus makes it possible to enrich the database of local simulation instances with a new local simulation instance and to re-learn the machine-learning algorithm on this enriched database. When re-computing the global physics simulation, one can then include the new local simulation instance he/she has chosen to add to the database in the global physics simulation and enjoy an improved machine-learning algorithm to perform the computation.

The providing of the new local simulation may be carried out as the providing S10 of each local simulation of the set of local simulations. The selecting of the respective zone of interest of the new local simulation may be carried out as the selecting S20 of each respective zone of interest of each local simulation of the set of local simulations. The computing of the respective reduced model of the new local simulation may be carried out as the computing S30 of each respective reduced model of each local simulation of the set of local simulations. The defining of probes of the new local simulation may be carried out as the defining S40 of probes of each local simulation of the set of local simulations.

Re-learning S4 the machine-learning algorithm on the database of local simulation instances consists in re-performing the learning S60 of the machine-learning algorithm, but this time on the database of local simulation instances comprising the new local simulation instance instead of the database of local simulation instances previously created.

Re-selecting S5 at least two local simulation instances consists in re-performing the selecting S1 of at least two local simulation instances, but this time the selection is carried out among the local simulation instances of the database of local simulation instances comprising the new local simulation instance, instead of the database of local simulation instances previously created.

Re-computing S7 the global physics simulation with the re-selected at least two local simulation instances consists in re-performing the computing S2 of the global simulation instance, only it is the respective computed reduced model of the local simulation instances of the re-selected at least two local simulation instances that are reused S220.

In examples, the method further comprises, after the re-learning S4 and before the re-computing S7, modifying S6 the global physics simulation.

The user may thus compute at least two different versions of the global physics simulation.

Modifying the global physics simulation may comprise changing one or more physical parameter and/or changing one or more boundary condition and/or changing the meshing of the global domain and/or changing the time scale of the global physics simulation and/or changing the disposition of the respective zones of interest occupying regions of the global domain.

With reference to FIG. 7 describing an example of simulating together the three wind turbines 74, 76 and 78 working in a wind farm in given wind conditions according to the method, modifying the global physics simulation may for instance consist in changing the positions of the wind turbines 74, 76 and 78 in the global domain 72 and/or changing the wind conditions (e.g. by modifying one or more parameter of the global physics simulation and/or one or more boundary condition).

In examples, the adding S3 and the recomputing S7 are iterated S8, as illustrated in FIG. 1

In examples, each local domain of each local simulation comprises a respective physical object. The local simulation simulates a respective physical behavior associated with the respective physical object. In these examples, the global physics simulation simulates a physical behavior of the set of all respective physical objects.

A physical object, in the meaning of the invention, is a product or an assembly of products or a real world physical entity. A physical behavior associated with an object may be a behavior of the object itself or a behavior of the object in an environment surrounding (e.g. a real-world environment) or a behavior of the object in interaction with the environment. A physical behavior associated with several objects is a physical behavior of said several objects together, e.g. in the same environment (e.g. a real-world environment). In may include interactions between the objects and/or with the environment.

It is provided below a table containing a list of non-limiting examples of global physics simulations, physical objects and physical behaviors. The method may contemplate the simulation of one or more of the examples of global physics simulation given in the table below.

TABLE 1 examples of global physics simulations

| Global physics simulation | Respective physical object | Respective physical behavior | Physical behavior of the set of objects |
| --- | --- | --- | --- |
| A wind farm composed of various (e.g. different) wind turbines | One of the wind turbines | The wind turbine working in given wind conditions | All wind turbines working together in the wind farm in given wind conditions |
| An aircraft wing with at least to (e.g. different) engines attached to the wing | One of the engines | The engine working in given flight and/or landing and/or take off conditions | The assembly formed by the wing and the engines working in given flight and/or landing and/or take off conditions |
| An assembly of electromagnet rings to enable plasma fusion confinement | One of the electromagnet rings | The electromagnetic ring working at different current levels, and the transition between them | The assembly in conditions of production an electromagnetic fields to confine the nuclear fusion |
| Antennas coverage from a buildings | A radio antenna | The antenna emitting from a given building | The set of antennas being able to emit with a good coverage in a city |
| An assembly of table with table legs | Table legs | The behavior of the legs under the weight of the table top | The assembly in condition of supporting the weight and load on the table top |

In examples, an interaction between two local simulation instances may model and/or simulate a real-world physical interaction among the following list of non-limiting examples:
  perturbation(s) of the wind surrounding a wind turbine due to another wind turbine working nearby;
  perturbation(s) of the air surrounding an aircraft engine due to another aircraft engine working nearby;
  perturbation(s) of the heat surrounding an aircraft engine due to another aircraft engine working nearby;
  perturbation(s) of the surrounding magnetic field of a ring in a thermonuclear power plant due to the nearby rings;
  perturbation(s) in the antenna radio coverage due to other nearby antenna;
  perturbation(s) due to structural connection between mechanical parts Any example of global physics simulations recited in table 1 may feature one or more plausible examples of interactions taken in the above list. Plausible combinations of the perturbations in the above list may also be contemplated by the method.

In examples, all local simulations of the set of local simulations are perturbations of a given local simulation. In these examples, the given local simulation is also part of the set of local simulations.

A first simulation is a perturbation of a second simulation if one has defined (e.g. set or programmed) the first simulation by changing one or more of the following features of the second simulation: boundary conditions, initial conditions, space discretization, value of at least one physical parameter, time scale.

In all examples, the method may further comprise, after the each computing the global physics simulation, the display of all computed global physics simulation (e.g. simultaneously or iteratively) on a display such as a GUI.

The invention claimed is:
1. A computer-implemented method for simulating together a plurality of physics simulation instances included in a global physics simulation, to save computing resources, the method comprising:
  creating a database of local simulation instances, the creating comprising:
    obtaining a set of local simulations, wherein:
      the set of local simulations comprises at least two local simulations, each local simulation being an independent local simulation within the global physics simulation and simulates a local physics model that is simulatable independently from a global physics model simulated by the global physics simulation, the global physics simulation simulating the global physics model of which simulation depends on simulating each local physics model of each local simulation, and each local simulation of the set of local simulations is already computed, for each local simulation of the set of local simulations, computing a respective reduced model of the local simulation, and for each local simulation of the set of local simulations, storing in the database a respective local simulation instance, the respective local simulation instance comprising the respective computed reduced model;

selecting at least two local simulation instances in the database of local simulation instances; and computing the global physics simulation, the computing of the global physics simulation including reusing each respective computed reduced model included in each local simulation instance of the selected at least two local simulation instances, wherein:

the global physics simulation is associated with a global domain, each local simulation is associated with a respective local domain, and the method further comprises:

before the computing of each respective reduced model of each local simulation:

selecting a respective zone of interest of the local simulation, the respective zone of interest being a non-empty sub-domain of the respective local domain;

at the computing of each respective reduced model of each local simulation:

computing each respective reduced model only at the border of the respective zone of interest; and at the computing of the global physics simulation:

placing the respective zone of interest of each local simulation of the selected at least two simulation instances in the global domain, and computing only the remaining part of the global domain, the remaining part being the part of the global domain that is occupied by no zone of interest, the global domain including regions that are respectively occupied by each respective zone of interest of each local simulation of the selected at least two local simulation instances, the computing of the remaining part reusing the respective reduced models computed at the border of each respective zone of interest, and wherein:

the global physics simulation is a simulation of functioning of a wind farm in given wind conditions, the wind farm comprising wind turbines, the global domain being a three-dimensional volume modelling the wind farm in the given wind conditions, and each local simulation is a simulation of functioning of a respective one of the wind turbines in the given wind conditions, the local simulation instance which corresponds to the local simulation forming data representing the simulation of functioning of respective one of the wind turbines in the given wind conditions and comprising the computed reduced model of the simulation of functioning of respective one of the wind turbines in the given wind condition, the local domain associated with the local simulation being a three-dimensional volume included in the global domain and encompassing the respective one of the wind turbines and modelling the respective one of the wind turbines and air surrounding the respective one of the wind turbines.

2. The method of claim 1, further comprising, at the placing of the respective zone of interest of each local simulation of the selected at least two local simulation instances, interfacing the border of the respective zone of interest with the border of the region of the global domain occupied by the respective zone of interest.

3. The method of claim 1, further comprising, for each local simulation of the set of local simulations, after the computing of the respective reduced model: defining probes, the probes being points of the respective local domain of the local simulation which are contiguous to the respective zone of interest, each probe comprising simulation data of the local simulation, wherein the stored local simulation instance comprising the respective computed reduced model further includes the probes and the respective zone of interest.

4. The method of claim 3, wherein:

during the computing of the global physics simulation, at least two simulations local instances of the at least two selected local simulation instances interact, the interaction resulting in that probes of at least one local simulation instance of the at least two simulation instances are enriched; and as a result of enriching probes, the respective computed reduced model included in a local simulation instance of which probes are enriched is corrected.

5. The method of claim 4, further comprising, for each local simulation instance of which probes are enriched:

before the correcting of the respective computed reduced model, computing a difference between the set of all enriched probes and the set of corresponding probes before their enrichment;

determining if the difference exceeds a predetermined threshold; and correcting the respective computed reduced model if it is determined that the difference exceeds the predetermined threshold.

6. The method of claim 5, wherein the method further comprises:

at the creating of the database of local simulation instances, learning a machine-learning algorithm on the local simulation instances stored in the database, the machine-learning algorithm providing, for each local simulation instance of the database, a respective relation between the probes stored in the local simulation instance and the respective computed reduced model stored in the local simulation instance; and for each local simulation instance of which probes are enriched, correcting the respective computed reduced model comprised in the local simulation instance comprises applying the machine-learning algorithm, the correcting being performed based on the respective relation.

7. The method of claim 6, wherein the method further comprises, after the computing of the global physics simulation:

adding a new local simulation instance to the database of local simulation instances, the adding of the new local simulation instance including:

obtaining a new local simulation, the new local simulation being already computed, the new local simulation being associated with a respective local domain, selecting a respective zone of interest of the new local simulation, the respective zone of interest being a non-empty sub-domain of the respective local domain, computing a respective reduced model of the new local simulation at the border of the respective zone of interest, defining probes, the probes being points of the respective local domain which are contiguous to the respective zone of interest, each probe comprising simulation data of the new local simulation, and storing in the database a new local simulation instance comprising the respective reduced model of the new local simulation, the probes of the new local simulation and the respective zone of interest of the new local simulation, wherein the adding resulting in that the new simulation instance is one of the local simulation instances of the database of local simulation instances, and wherein the method further comprises:

after the adding of the new local simulation instance,
re-learning the machine-learning algorithm on the database of simulation instance,
re-selecting at least two local simulation instances in the database of local simulation instances, the re-selected at least two local simulation instances comprising the new local simulation instance, and
re-computing of the global physics simulation with the re-selected at least two local simulation instances.

8. The method of claim 7, further comprising, after the relearning and before the re-computing, modifying the global physics simulation.

9. The method of claim 7, wherein the adding and the re-computing are iterated.

10. The method of claim 4, wherein at each correcting of a respective reduced model as a result of the enriching of probes, a simulation instance is stored in the database, the simulation instance comprising the corrected reduced model and the enriched probes.

11. The method of claim 1, wherein:
each respective local domain of each local simulation includes a respective physical object, the local simulation simulating a respective physical behavior associated with the respective physical object, and
the global physics simulation simulates a physical behavior of the set of all respective physical objects.

12. The method of claim 1, wherein all local simulations are perturbations of a given local simulation, the given local simulation being part of the set of local simulations.

13. A non-transitory data storage medium having recorded thereon a computer program comprising instructions for performing a method for simulating together a plurality of physics simulation instances included in a global physics simulation, to save computing resources, the method comprising:

creating a database of local simulation instances, the creating including:
obtaining a set of local simulations, wherein:
the set of local simulations comprises at least two local simulations, each local simulation being an independent local simulation within the global physics simulation and simulates a local physics model that is simulatable independently from a global physics model simulated by the global physics simulation, the global physics simulation simulating the global physics model of which simulation depends on simulating each local physics model of each local simulation, and
each local simulation of the set of local simulations is already computed;
for each local simulation of the set of local simulations, computing a respective reduced model of the local simulation, and
for each local simulation of the set of local simulations, storing in the database a respective local simulation instance, the respective local simulation instance comprising the respective computed reduced model;
selecting at least two local simulation instances in the database of local simulation instances; and
computing the global physics simulation, the computing of the global physics simulation comprising reusing each respective computed reduced model comprised in each local simulation instance of the selected at least two local simulation instances,
wherein:
the global physics simulation is associated with a global domain,
each local simulation is associated with a respective local domain, and
the method further comprises:
before the computing of each respective reduced model of each local simulation:
selecting a respective zone of interest of the local simulation, the respective zone of interest being a non-empty sub-domain of the respective local domain;
at the computing of each respective reduced model of each local simulation:
computing each respective reduced model only at the border of the respective zone of interest; and
at the computing of the global physics simulation:
placing the respective zone of interest of each local simulation of the selected at least two simulation instances in the global domain, and
computing only the remaining part of the global domain, the remaining part being the part of the global domain that is occupied by no zone of interest, the global domain including regions that are respectively occupied by each respective zone of interest of each local simulation of the selected at least two local simulation instances, the computing of the remaining part reusing the respective reduced models computed at the border of each respective zone of interest, and
wherein:
the global physics simulation is a simulation of functioning of a wind farm in given wind conditions, the wind farm comprising wind turbines, the global domain being a three-dimensional volume modelling the wind farm in the given wind conditions, and
each local simulation is a simulation of functioning of a respective one of the wind turbines in the given wind conditions, the local simulation instance which corresponds to the local simulation forming data representing the simulation of functioning of respective one of the wind turbines in the given wind conditions and comprising the computed reduced model of the simulation of functioning of respective one of the wind turbines in the given wind condition, the local domain associated with the local simulation being a three-dimensional volume included in the global domain and encompassing the respective one of the wind turbines and modelling the respective one of the wind turbines and air surrounding the respective one of the wind turbine.

14. The data storage medium of claim 13, wherein the method further comprises, at the placing of the respective zone of interest of each local simulation of the selected at least two local simulation instances, interfacing the border of the respective zone of interest with the border of the region of the global domain occupied by the respective zone of interest.

15. The data storage medium of claim 13, wherein the method further comprises, for each local simulation of the set of local simulations, after the computing of the respective reduced model: defining probes, the probes being points of the respective local domain of the local simulation which are contiguous to the respective zone of interest, each probe comprising simulation data of the local simulation, and
wherein the stored local simulation instance comprising the respective computed reduced model further comprises the probes and the respective zone of interest.

16. A system comprising:
a processor coupled to a memory and a display, the memory having recorded thereon a computer program comprising instructions for simulating together a plurality of physics simulation instances included in a global physics simulation to save computing resources that when executed by the processor causes the processor to be configured to
create a database of local simulation instances, the creating including the processor being configured to:
obtain a set of local simulations, wherein:
the set of local simulations comprises at least two local simulations, each local simulation being an independent local simulation within the global physics simulation and simulates a local physics model that is simulatable independently from a global physics model simulated by the global physics simulation, the global physics simulation simulating the global physics model of which simulation depends on simulating each local physics model of each local simulation, and
each local simulation of the set of local simulations is already computed,
for each local simulation of the set of local simulations, compute a respective reduced model of the local simulation, and
for each local simulation of the set of local simulations, store in the database a respective local simulation instance, the respective local simulation instance comprising the respective computed reduced model;
select at least two local simulation instances in the database of local simulation instances; and
compute the global physics simulation, the computing of the global physics simulation including reusing each respective computed reduced model comprised in each local simulation instance of the selected at least two local simulation instances,
wherein:
the global physics simulation is associated with a global domain,
each local simulation is associated with a respective local domain, and
before the computing of each respective reduced model of each local simulation the processor is further configured to:
select a respective zone of interest of the local simulation, the respective zone of interest being a non-empty sub-domain of the respective local domain;
at the computing of each respective reduced model of each local simulation:
compute each respective reduced model only at the border of the respective zone of interest; and
at the computing of the global physics simulation:
place the respective zone of interest of each local simulation of the selected at least two simulation instances in the global domain, and
compute only the remaining part of the global domain, the remaining part being the part of the global domain that is occupied by no zone of interest, the global domain including regions that are respectively occupied by each respective zone of interest of each local simulation of the selected at least two local simulation instances, the computing of the remaining part reusing the respective reduced models computed at the border of each respective zone of interest,
wherein:
the global physics simulation is a simulation of functioning of a wind farm in given wind conditions, the wind farm comprising wind turbines, the global domain being a three-dimensional volume modelling the wind farm in the given wind conditions, and
each local simulation is a simulation of functioning of a respective one of the wind turbines in the given wind conditions, the local simulation instance which corresponds to the local simulation forming data representing the simulation of functioning of respective one of the wind turbines in the given wind conditions and comprising the computed reduced model of the simulation of functioning of respective one of the wind turbines in the given wind condition, the local domain associated with the local simulation being a three-dimensional volume included in the global domain and encompassing the respective one of the wind turbines and modelling the respective one of the wind turbines and air surrounding the respective one of the wind turbine.

17. The system of claim 16, wherein the processor is further configured to, at the placing of the respective zone of interest of each local simulation of the selected at least two local simulation instances, interface the border of the respective zone of interest with the border of the region of the global domain occupied by the respective zone of interest.

* * * * *